US012395200B2

(12) United States Patent
Yun et al.

(10) Patent No.: US 12,395,200 B2
(45) Date of Patent: Aug. 19, 2025

(54) ELECTRONIC DEVICE COMPRISING ANTENNA, AND OPERATION METHOD THEREOF

(71) Applicant: SAMSUNG ELECTRONICS CO., LTD., Suwon-si (KR)

(72) Inventors: Himchan Yun, Suwon-si (KR); Nakchung Choi, Suwon-si (KR); Shinho Yoon, Suwon-si (KR); Soonho Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 383 days.

(21) Appl. No.: 18/105,667

(22) Filed: Feb. 3, 2023

(65) Prior Publication Data

US 2023/0188173 A1    Jun. 15, 2023

Related U.S. Application Data

(63) Continuation of application No. PCT/KR2021/010191, filed on Aug. 4, 2021.

(30) Foreign Application Priority Data

Aug. 4, 2020  (KR) .................. 10-2020-0097307

(51) Int. Cl.
*H04B 1/3888* (2015.01)
*H04B 1/3827* (2015.01)
*H04M 1/02* (2006.01)

(52) U.S. Cl.
CPC ......... *H04B 1/3838* (2013.01); *H04B 1/3888* (2013.01); *H04M 1/0202* (2013.01)

(58) Field of Classification Search
CPC .. H04B 1/3838; H04B 1/3888; H04M 1/0202
(Continued)

(56) References Cited

U.S. PATENT DOCUMENTS 9,239,591 B2 * 1/2016 Kim ................... H04M 1/0237
9,337,882 B2 * 5/2016 Song ................... H04B 1/3888
(Continued)

FOREIGN PATENT DOCUMENTS

KR    10-2012-0028280 A   3/2012
KR       10-1490156 B1    2/2015
(Continued)

OTHER PUBLICATIONS

Communication issued Dec. 23, 2024 by the Korean Intellectual Property Office in Korean Patent Application No. 10-2020-0097307.
(Continued)

*Primary Examiner* — April G Gonzales
(74) *Attorney, Agent, or Firm* — Sughrue Mion, PLLC

(57) ABSTRACT

An electronic device includes a frame structure forming at least a part of the side surface of the electronic device, the frame structure including a first insulating portion, a second insulating portion, a third insulating portion, a first conductive portion, a second conductive portion and a third conductive portion, a wireless communication circuit, a first switching circuit configured to connect the wireless communication circuit and at least one of the first conductive portion and the second conductive portion, a second switching circuit configured to connect the wireless communication circuit and at least one of the second conductive portion and the third conductive portion, and a proximity sensor configured to detect a proximity of a human body.

20 Claims, 24 Drawing Sheets

(58) Field of Classification Search
USPC ......................................................... 455/552.1
See application file for complete search history.

(56) References Cited

U.S. PATENT DOCUMENTS

| | | | | |
|---|---|---|---|---|
| 9,728,854 B2* | 8/2017 | Kim | ........................ | H01Q 9/045 |
| 10,236,560 B2 | 3/2019 | Shin et al. | | |
| 10,253,560 B2* | 4/2019 | Ding | ..................... | E06B 3/6715 |
| 10,263,334 B2* | 4/2019 | Hu | ........................... | H01Q 1/36 |
| 10,305,166 B2* | 5/2019 | Kim | ........................ | H01Q 21/28 |
| 10,476,167 B2* | 11/2019 | Ayala Vazquez | .. | H01Q 21/0006 |
| 10,511,342 B1* | 12/2019 | Chung | ................. | H04B 1/3888 |
| 10,543,669 B2* | 1/2020 | Balaji | .................... | B65D 25/00 |
| 10,819,010 B2* | 10/2020 | Lee | ........................... | H01Q 9/14 |
| 10,849,397 B1* | 12/2020 | Piper | ..................... | A45C 11/00 |
| 10,887,683 B1* | 1/2021 | Choi | ........................ | H04R 1/028 |
| 10,951,245 B2* | 3/2021 | Lee | ........................ | H04B 1/006 |
| 2012/0062424 A1* | 3/2012 | Hwang | ................ | H04B 1/3838 |
| | | | | 342/374 |
| 2013/0088405 A1* | 4/2013 | Lee | ..................... | H04B 1/0458 |
| | | | | 343/861 |
| 2014/0043740 A1* | 2/2014 | Richardson | ............ | H05K 5/061 |
| | | | | 361/679.01 |
| 2015/0250020 A1* | 9/2015 | Lee | ................ | H04W 36/00224 |
| | | | | 455/552.1 |
| 2016/0254832 A1* | 9/2016 | Yoo | ........................ | H01Q 13/10 |
| | | | | 455/575.5 |
| 2016/0308572 A1* | 10/2016 | Shin | ........................ | H04B 1/385 |
| 2017/0006738 A1* | 1/2017 | Lee | .................... | H05K 7/20963 |
| 2017/0279942 A1* | 9/2017 | Shin | .................... | H04M 1/0254 |
| 2017/0373712 A1* | 12/2017 | Kim | ..................... | H04B 7/0834 |
| 2018/0026361 A1* | 1/2018 | Sakong | .................... | H01Q 1/48 |
| | | | | 343/860 |
| 2018/0041239 A1* | 2/2018 | Youn | ..................... | G06F 1/1698 |
| 2019/0067797 A1* | 2/2019 | Jung | ..................... | H04M 1/026 |
| 2019/0128937 A1* | 5/2019 | Choi | ..................... | G06F 1/1698 |
| 2019/0222683 A1* | 7/2019 | Choi | .................... | H05K 5/0086 |
| 2019/0245957 A1* | 8/2019 | Bui | ........................ | G06F 1/1635 |
| 2019/0260112 A1* | 8/2019 | Azad | ........................ | H01Q 9/42 |
| 2019/0312334 A1* | 10/2019 | Shin | .................... | H04M 1/0249 |
| 2019/0386696 A1* | 12/2019 | Luo | ........................... | A45C 5/02 |
| 2019/0386697 A1* | 12/2019 | Luo | ........................ | H04B 1/3888 |
| 2020/0006717 A1* | 1/2020 | Lei | ........................ | H05K 5/0217 |
| 2020/0201386 A1* | 6/2020 | Hwang | ............... | H04M 1/0202 |

FOREIGN PATENT DOCUMENTS

| | | |
|---|---|---|
| KR | 10-2017-0019838 A1 | 2/2017 |
| KR | 10-2017-0071200 A | 6/2017 |
| KR | 10-2017-0120790 A | 11/2017 |
| KR | 10-2018-0039425 A | 4/2018 |
| WO | 2020/122598 A1 | 6/2020 |

OTHER PUBLICATIONS

International Search Report (ISA/210) dated Dec. 9, 2021 issued by the International Searching Authority in PCT/KR2021/010191.
Written Opinion (ISA/237) dated Dec. 9, 2021 issued by the International Searching Authority in PCT/KR2021/010191.
Communication dated Dec. 22, 2023, issued by the European Patent Office in European Application No. 21853634.0.

* cited by examiner

ELECTRONIC DEVICE COMPRISING ANTENNA, AND OPERATION METHOD THEREOF

CROSS-REFERENCE TO RELATED APPLICATION(S)

This application is a bypass continuation of International Application No. PCT/KR2021/010191, filed on Aug. 4, 2021, which is based on and claims priority to Korean Patent Application No. 10-2020-0097307, filed on Aug. 4, 2020, in the Korean Intellectual Property Office, the disclosures of which are incorporated by reference herein in their entireties.

BACKGROUND

1. Field

The disclosure relates to an antenna for overcoming human body effects and an electronic device including the same.

2. Description of Related Art

A portable electronic device such as a portable communication device, a mobile terminal, a mobile communication terminal, or a smart phone may communicate with an external electronic device using a communication circuit and an antenna, or may use a predetermined network to be connected to an external device disposed in a short distance.

Technologies have been developed to increase the rigidity of the electronic device, strengthen the design aspect, and slim down in order to satisfy the purchasing desire of consumers. As part of this trend, an electronic device has been developed to efficiently secure an arrangement space for at least one antenna device, which should be essentially provided for communication among elements, prevent degradation of radiation performance in advance, and achieve excellent performance.

According to various embodiments, an antenna device used in an electronic device may include an Inverted-F Antenna (IFA) or a monopole antenna. In addition, the volume and number of antenna radiators mounted in a portable electronic device may be determined according to the frequency, bandwidth, and type of each communication service. For example, there are differences in frequency by regional groups of the world, but usually a low-band of 600 MHz to 1000 MHz, a mid-band of 1700 MHz to 2200 MHz, a high-band of 2300 MHz to 2700 MHz, and the like are used as major communication bands. Alternatively, an electronic device may use various frequencies for various wireless communication services such as Bluetooth (BT), global navigation satellite system (GNSS), and Wi-Fi.

In order to satisfy all of the above-described communication bands in a limited antenna volume, an electronic device has a practical difficulty in securing all bands with only one antenna. Antennas of an electronic device are designed to be separated into several service bands having similar frequency bands so as to overcome the difficulty.

An electronic device may include a metal member (e.g., a metal bezel, etc.) in the exterior of the electronic device. An electronic device may utilize a metal member forming an exterior as an antenna radiator. For example, when a metal bezel used for an edge of an electronic device is used as an antenna radiator, the electronic device may include a main antenna radiator and at least one coupling antenna radiator, having a segmentation portion made of a dielectric material interposed therebetween. In an electronic device, an electrical gap may be formed by a segmentation portion between a main antenna radiator and a coupling antenna radiator, and thus resonance may be formed in a desired frequency band using the coupling antenna radiator.

However, in a case where a user grips an electronic device to bring the user in contact with a segmentation portion of an antenna, the electronic device may have a problem in that radiation performance of the antenna is significantly deteriorated due to a change in capacitance and an increase in dielectric loss of the segmentation portion.

SUMMARY

Provided are a device and method for preventing degradation of radiation performance due to a change in capacitance of a bezel portion used as an antenna in an electronic device.

According to an aspect of the disclosure, an electronic device includes a frame structure forming at least a part of a side surface of the electronic device, the side surface surrounding a space between a front surface of the electronic device and a rear surface of the electronic device and including a first edge, a second edge extending from the first edge and perpendicular to the first edge, and a third edge extending from the second edge and parallel to the first edge, and the frame structure including a first insulating portion disposed in the first edge, a second insulating portion disposed in the second edge, a third insulating portion disposed in the second edge, a first conductive portion extending from the first insulating portion to the second edge, a second conductive portion spaced apart from the first conductive portion by the second insulating portion and corresponding to a part of the second edge, a third conductive portion spaced apart from the second conductive portion by the third insulating portion and extending to the third edge; a wireless communication circuit disposed in the space; a first switching circuit configured to connect the wireless communication circuit and at least one of the first conductive portion and the second conductive portion; a second switching circuit configured to connect the wireless communication circuit and at least one of the second conductive portion and the third conductive portion; and a proximity sensor configured to detect a proximity of a human body with respect to the first edge, and the wireless communication circuit is configured to, based on the proximity of the human body being not detected by the proximity sensor, feed power to the first conductive portion via the first switching circuit and feed power to the second conductive portion via the second switching circuit, and based on the proximity of the human body being detected by the proximity sensor, feed power to the first conductive portion and the second conductive portion via the first switching circuit and feed power to the third conductive portion via the second switching circuit.

The electronic device may further include a processor electrically connected to the wireless communication circuit, and a third switching circuit connected to the first conductive portion, and the wireless communication circuit or the processor may be configured to, based on the proximity of the human body being detected by the proximity sensor, control the third switching circuit to change electrical paths related to the first conductive portion.

The wireless communication circuit may be configured to, based on the proximity of the human body being detected by the proximity sensor, feed power to the first conductive portion and the second conductive portion via the first switching circuit, feed power to the third conductive portion via the second switching circuit, and then release a connection of the wireless communication circuit with the first conductive portion.

The electronic device may further include a processor electrically connected to the wireless communication circuit, and a fourth switching circuit connected to the second conductive portion, and the processor may be configured to control the fourth switching circuit to change electrical paths related to the second conductive portion.

The proximity sensor may be disposed in the space.

The wireless communication circuit may be configured to, based on the proximity of the human body being not detected by the proximity sensor, feed power to the first conductive portion via the first switching circuit, and feed power to the second conductive portion and the third conductive portion via the second switching circuit.

According an aspect of the disclosure, a method of operating an antenna of an electronic device includes detecting proximity of a human body with respect to a first edge of the electronic device, based on the proximity of the human body being not detected, feeding, by a wireless communication circuit of the electronic device, power to a first conductive portion formed in at least a part of the first edge via a first switching circuit of the electronic device and feeding by the wireless communication circuit, power to a second conductive portion spaced apart from the first conductive portion via a second switching circuit of the electronic device, and based on the proximity of the human body being detected, feeding, by the wireless communication circuit, power to the first conductive portion and the second conductive portion via the first switching circuit and feeding, by the wireless communication circuit, power to a third conductive portion spaced apart from the second conductive portion via the second switching circuit.

The method may further include, based on the proximity of the human body being detected, changing electrical paths related to the first conductive portion via a third switching circuit of the electronic device.

The method may further include, based on the proximity of the human body being detected, feeding, by the wireless communication circuit, power to the first conductive portion and the second conductive portion via the first switching circuit, feeding, by the wireless communication circuit, power to the third conductive portion via the second switching circuit, and then releasing a connection of the wireless communication circuit with the first conductive portion.

The method may further include changing electrical paths related to the second conductive portion via a fourth switching circuit of the electronic device.

The method may further include, based on the proximity of the human body being not detected, feeding, by the wireless communication circuit, power to the first conductive portion via the first switching circuit and feeding, by the wireless communication circuit, power to the second conductive portion and the third conductive portion via the second switching circuit.

The method may further include, based on the proximity of the human body being not detected, feeding, by the wireless communication circuit, power to the first conductive portion via the first switching circuit and feeding, by the wireless communication circuit, power to the third conductive portion via the second switching circuit.

The detecting of the proximity of the human body may be performed by a proximity sensor disposed in the electronic device.

The electronic device may further include a second edge extending from the first edge and perpendicular to the first edge, and a third edge extending from the second edge and parallel to the first edge, and the electronic device further include a first insulating portion formed in the first edge, a second insulating portion formed in the second edge and disposed between the first conductive portion and the second conductive portion, and a third insulating portion formed in the second edge and disposed between the second conductive portion and the third conductive portion.

According to an aspect of the disclosure, an electronic device includes a frame structure forming at least a part of the side surface of the electronic device, the side surface surrounding a space between a front surface of the electronic device and a rear surface of the electronic device and including a first edge, a second edge extending from the first edge and perpendicular to the first edge, and a third edge extending from the second edge and parallel to the first edge, and the frame structure including a first insulating portion disposed in the first edge, a second insulating portion disposed in the second edge, a third insulating portion positioned in the second edge, a first conductive portion extending from the first insulating portion to the second edge, a second conductive portion spaced apart from the first conductive portion by the second insulating portion and corresponding to a part of the second edge, a third conductive portion spaced apart from the second conductive portion by the third insulating portion and extending to the third edge; a first wireless communication circuit and a second wireless communication circuit disposed in the space; a first switching circuit configured to connect the first wireless communication circuit and at least one of the first conductive portion and the second conductive portion; a second switching circuit configured to connect the second wireless communication circuit and at least one of the second conductive portion and the third conductive portion; and a proximity sensor configured to detect a proximity of a human body with respect to the first edge, and based on the proximity of the human body being not detected by the proximity sensor, the first wireless communication circuit is configured to feed power to the first conductive portion via the first switching circuit and feed power to the second conductive portion via the second switching circuit, and based on the proximity of the human body being detected by the proximity sensor, the first wireless communication circuit is configured to feed power to the first conductive portion and the second conductive portion via the first switching circuit and the second wireless communication circuit is configured to feed power to the third conductive portion via the second switching circuit.

Based on the proximity of the human body being detected by the proximity sensor, the first wireless communication circuit may be configured to transmit or receive a first signal in a first frequency band via the first conductive portion and the second conductive portion, and the second wireless communication circuit may be configured to transmit or receive a second signal in a second frequency band different from the first frequency band via the third conductive portion.

The electronic device may further include a third switching circuit connected to the first conductive portion and configured to change electrical paths related to the first conductive portion.

The electronic device may further include a fourth switching circuit to the second conductive portion and configured to change electrical paths related to the second conductive portion.

The electronic device may further include a processor electrically connected to the first wireless communication circuit and the second wireless communication circuit, and the processor is configured to determine whether the first wireless communication circuit is used alone or the first wireless communication circuit among the first wireless communication circuit and the second wireless communication circuit is preferentially used to transmit or receive a signal, and based on the first wireless communication circuit being used alone or the first wireless communication circuit among the first wireless communication circuit and the second wireless communication circuit being preferentially used, determine whether the proximity of the human body is detected by the proximity sensor.

The processor may be further configured to, based on the first wireless communication circuit being not used alone or the first wireless communication circuit among the first wireless communication circuit and the second wireless communication circuit being not preferentially used, determine whether the second first wireless communication circuit is used alone or the second wireless communication circuit among the first wireless communication circuit and the second wireless communication circuit is preferentially used to transmit or receive the signal.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
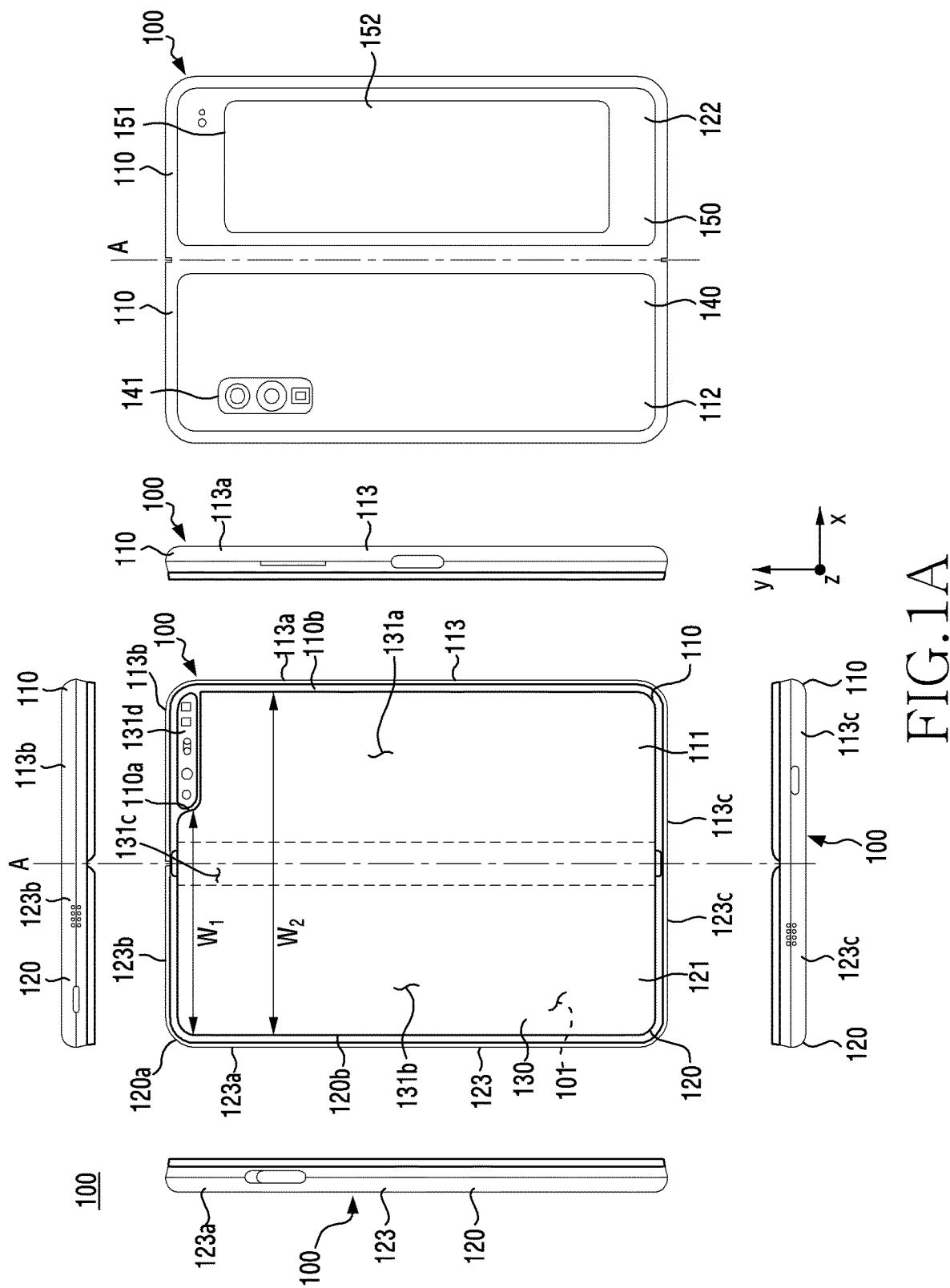
FIG. 1A illustrates an unfolded state of an electronic device according to an embodiment.
Figure 1B:
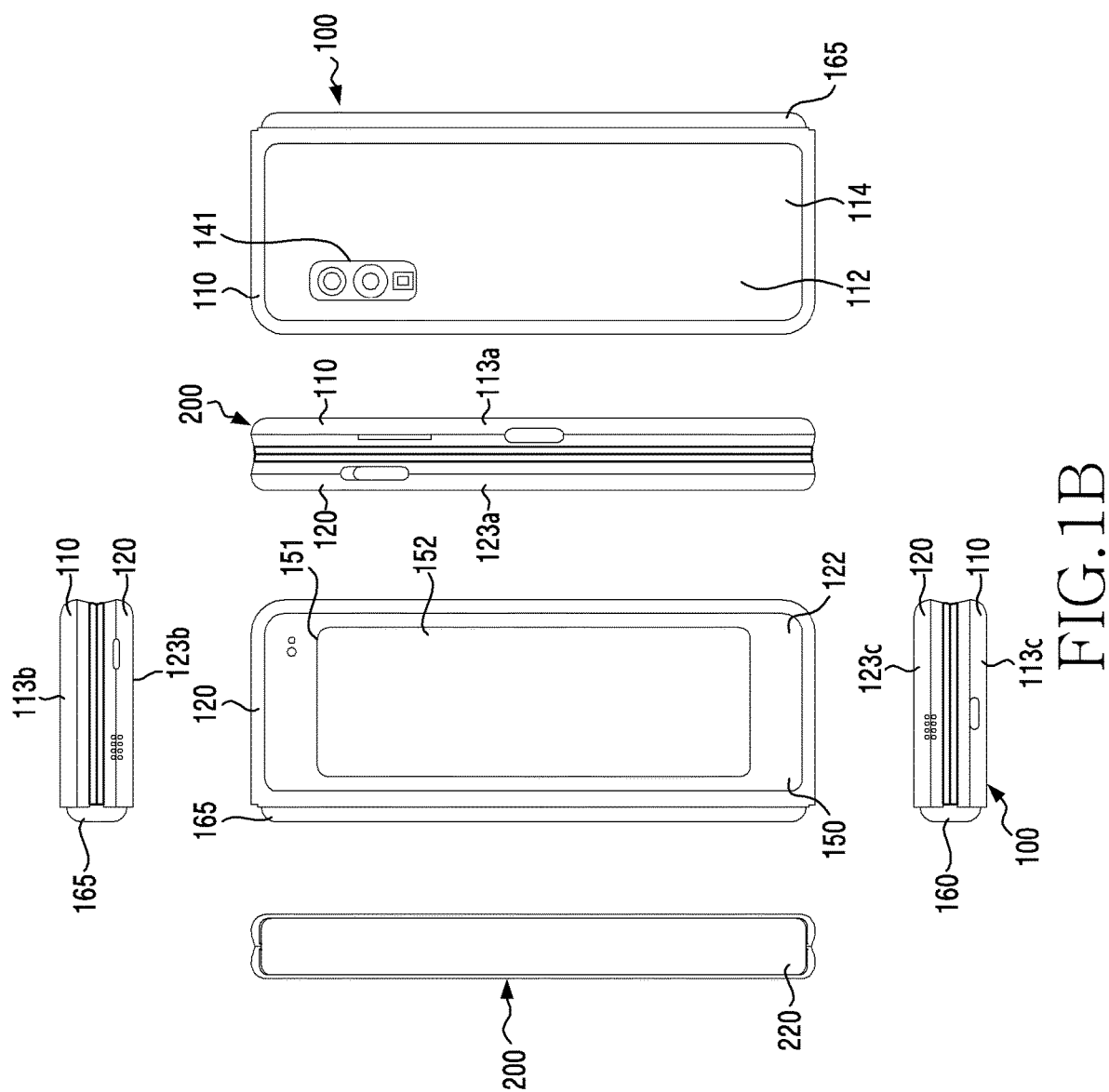
FIG. 1B illustrates a folded state of an electronic device according to an embodiment.

FIG. 1A illustrates an unfolded state of an electronic device 100 according to various embodiments of the disclosure. FIG. 1B illustrates a folded state of the electronic device 100 of FIG. 1A according to various embodiments of the disclosure.

Referring to FIG. 1A, the electronic device 100 may include a pair of housing structures 110 and 120 rotatably coupled via a hinge structure to be folded with respect to each other, a hinge cover 165 configured to cover a foldable portion of the pair of housing structures 110 and 120, and a display 130 (e.g., a flexible display or a foldable display) disposed in a space formed by the pair of housing structures 110 and 120. In the disclosure, a surface on which the display 130 is disposed may be defined as a front surface of the electronic device 100, and the opposite surface of the front surface may be defined as a rear surface of the electronic device 100. In addition, a surface surrounding a space between the front surface and the rear surface may be defined as a side surface of the electronic device 100.

In an embodiment, the pair of housing structures 110 and 120 may include a first housing structure 110 including a sensor area 131d, a second housing structure 120, a first rear cover 140, and a second rear cover 150. The pair of housing structures 110 and 120 of the electronic device 100 may not be limited by the form and coupling illustrated in FIG. 1A and FIG. 1B, and may be implemented by another form or a combination and/or coupling of components. For example, in another embodiment, the first housing structure 110 and the first rear cover 140 may be integrally formed, and the second housing structure 120 and the second rear cover 150 may be integrally formed. According to an embodiment, the first housing structure 110 and the second housing structure 120 may be arranged at opposite sides around a folding axis (axis A), and may have an entirely symmetrical shape with respect to the folding axis (axis A). According to an embodiment, the angle or distance between the first housing structure 110 and the second housing structure 120 may vary according to whether the electronic device 100 is in an unfolded state (flat stage or opening state), a folded state (folding state), or an intermediate state. According to an embodiment, unlike the second housing structure 120, the first housing structure 110 may additionally include the sensor area 131d in which various sensors are arranged, but may have a mutually symmetrical shape in the other areas. In another embodiment, the sensor area 131d may be additionally disposed or replaced in at least a partial area of the second housing structure 120.

In an embodiment, in an unfolded state of the electronic device 100, the first housing structure 110 may be connected to a hinge structure and may include a first surface 111 disposed to face the front surface of the electronic device 100, a second surface 112 facing a direction opposite to the first surface 111, and a first side surface member 113 surrounding at least a part of a space between the first surface 111 and the second surface 112. In an embodiment, the first side surface member 113 may include a first side surface 113a disposed parallel to the folding axis (axis A), a second side surface 113b extending from one end of the first side surface 113a in a direction perpendicular to the folding axis, and a third side surface 113c extending from the other end of the first side surface 113a in a direction perpendicular to the folding axis (axis A).

In an embodiment, in an unfolded state of the electronic device 100, the second housing structure 120 may be connected to a hinge structure (e.g., a hinge structure 160 of FIG. 1B), and may include a third surface 121 disposed to face the front surface of the electronic device 100, a fourth surface 122 facing a direction opposite to the third surface 121, and a second side surface member 123 surrounding at least a part of a space between the third surface 121 and the fourth surface 122. In an embodiment, the second side surface member 123 may include a fourth side surface 123a disposed parallel to the folding axis (axis A), a fifth side surface 123b extending from one end of the fourth side surface 123a in a direction perpendicular to the folding axis (axis A), and a sixth side surface 123c extending from the other end of the fourth side surface 123a in a direction perpendicular to the folding axis (axis A). In an embodiment, the third surface 121 may face the first surface 111 in a folded state.

In an embodiment, the electronic device 100 may include a recess 101 configured to receive the display 130 via the structural shape combination of the first housing structure 110 and the second housing structure 120. The recess 101 may have substantially the same size as the display 130. In an embodiment, due to the sensor area 131d, the recess 101 may have two or more widths different from each other in a direction perpendicular to the folding axis (axis A). For example, the recess 101 may have a first width (W1) between a first portion 120a parallel to the folding axis (axis A) in the second housing structure 120 and a first portion 110a disposed at an edge of the sensor area 131d in the first housing structure 110, and a second width (W2) configured by a second portion 110b of the second housing structure 110 and a second portion 110b parallel to the folding axis (axis A) in the first housing structure 110 while the second portion 110b does not correspond to the sensor area 113d. The second width (W2) may be configured longer than the first width (W1). For example, the recess 101 may be configured to have the first width (W1) formed from the first portion 110a of the first housing structure 110 having a mutually asymmetrical shape to the first portion 120a of the second housing structure 120 and a second width (W2) formed from the second portion 110b of the first housing structure 110 having a mutually symmetrical shape to the second portion 120b of the second housing structure 120. In an embodiment, the first portion 110a and the second portion 110b of the first housing structure 110 may be configured to have distances, which are different from each other, from the folding axis (axis A). The width of the recess 101 is not limited by the illustrated example. In various embodiments, the recess 101 may have one or more widths different from each other by the form of the sensor area 113d or a portion, which has an asymmetrical shape, of the first housing structure 110 and the second housing structure 120.

In an embodiment, at least a part of the first housing structure 110 and the second housing structure 120 may be configured of a metal material or a non-metal material having a rigidity of the magnitude selected to support the display 130.

In an embodiment, the sensor area 131d may be disposed adjacent to one side corner of the first housing structure 110 to have a predetermined area. The arrangement, shape, or size of the sensor area 131d is not limited to the shown example. For example, in another embodiment, the sensor area 131d may be provided in another corner of the first housing structure 110 or in an arbitrary area between an upper end corner of the first housing structure 110 and a lower end corner of the first housing structure 110. In another embodiment, the sensor area 131d may be disposed in at least a partial area of the second housing structure 120. In another embodiment, the sensor area 231d may be disposed in a first housing 211 or be disposed to extend to the first housing 211. In an embodiment, the electronic device 200 may be components configured to perform various functions arranged to be exposed to the front surface of the electronic device 100 via a sensor area 213d or via one or more openings provided in the sensor area 131d. In various embodiments, the components may include, for example, at least one among a front camera device, a receiver, a proximity sensor, an illuminance sensor, an iris recognition sensor, an ultrasonic sensor, or an indicator.

In an embodiment, the first rear cover 140 may be disposed on the second surface 112 of the first housing structure 110 and may have a substantially rectangular periphery. In an embodiment, at least a part of the periphery may be surrounded by the first housing structure 110. Similarly, the second rear cover 150 may be disposed on the fourth surface 122 of the second housing structure 120, and at least a part of the periphery may be surrounded by the second housing structure 120.

In the shown embodiment, the first rear cover 140 and the second rear cover 150 may have a substantially symmetrical shape based on the folding axis (axis A). In another embodiment, the first rear cover 140 and the second rear cover 150 may include various shapes different from each other. In another embodiment, the first rear cover 140 may be integrally disposed with the first housing structure 110, and the second rear cover 150 may be integrally disposed with the second housing structure 120.

In an embodiment, the first rear cover 140, the second rear cover 150, the first housing structure 110, and the second housing structure 120 may provide, via a structure coupled to each other, a space in which various components (e.g., a printed circuit board, an antenna module, a sensor module, or a battery) of the electronic device 100 may be arranged. In an embodiment, one or more components may be arranged or visually exposed on the rear surface of the electronic device 100. For example, one or more components or sensors may be visually exposed via a first rear area 141 of the first rear cover 140. In various embodiments, the sensors may include a proximity sensor, a rear surface camera device, and/or a flash. In another embodiment, at least a part of a sub display 152 may be visually exposed via a second rear area 151 of the second rear cover 150. The display 130 may be disposed in a space formed by the foldable housing structures 110 and 120. For example, the display 130 may be stably seated in a recess formed by the pair of housing structures 110 and 120, and may be disposed to substantially occupy most of the front surface of the electronic device 100. Therefore, the front surface of the electronic device 100 may include the display 130 and a partial area (e.g., a peripheral area) of the first housing structure 110, adjacent to the display 130, and a partial area (e.g., a peripheral area) of the first housing structure 110. In an embodiment, the rear surface of the electronic device 100 may include the first rear cover 140, a partial area (e.g., a peripheral area) of the first housing structure 110 adjacent to the first rear cover 140, the second rear cover 150, and a partial area (e.g., a peripheral area) of the first housing structure 110 adjacent to the second rear cover 150.

In an embodiment, the display 130 may refer to a display in which at least a partial area may be transformed into a flat surface or a curved surface. In an embodiment, the display 130 may include a folding area 131c, a first area 131a disposed at one side (e.g., a right area of the folding area 131c) based on the folding area 131c, and a second area 131b disposed at the other side (e.g., a left area of the folding area 131c). For example, the first area 131a may be disposed on the first surface 111 of the first housing structure 110, and the second area 131b may be disposed on the third surface 121 of the first housing structure 110. In an embodiment, the area division of the display 130 is exemplary, and the display 130 may be divided into a plurality (four or more, or one) of areas according to the structure or function thereof. As an example, in the embodiment shown in FIG. 1A, the area of the display 130 may be divided by the folding axis (axis A) or the folding area 131c extending parallel to they axis, but in another embodiment, the area of the display 130 may be divided based on another folding axis (e.g., the folding axis parallel to the x axis) or another folding area (e.g., the folding area parallel to the x axis). The area division of the display described above is only a physical division by the pair of housing structures 110 and 120 and the hinge structure, and substantially, the display 130 may be displayed as one full screen via the pair of housing structures 110 and 120 and the hinge structure (e.g., a hinge structure 160 of FIG. 1B). In an embodiment, the first area 131a and the second area 131b may have an entirely symmetrical shape around the folding area 131c. Unlike the second area 131b, the first area 131a may include a cut notch area (e.g., a notch area of FIG. 3) depending on the presence of the sensor area 131d, but may have a shape symmetrical to the second area 131b in the other area. For example, the first area 131a and the second area 131b may include a portion having a shape symmetrical to each other and a portion having a shape asymmetrical to each other.

Referring to FIG. 1B, the hinge cover 165 may be configured to be disposed between the first housing structure 110 and the second housing structure 120 to cover internal components (e.g., the hinge structure 160 of FIG. 1B). In an embodiment, the hinge cover 165 may be covered by a part of the first housing structure 110 and the second housing structure 120 or be exposed to the outside, according to the operation state (an unfolded state (flat state) or a folded state) of the electronic device 100.

As an example, as shown in FIG. 1A, in a case where the electronic device 100 is in an unfolded state, the hinge cover 165 may be covered by the first housing structure 110 and the second housing structure 120, and thus may not be exposed. As an example, as shown in FIG. 1B, in a case where the electronic device 100 is in a folded state (e.g., a completely folded state), the hinge cover 165 may be exposed to the outside between the first housing structure 110 and the second housing structure 120. In an embodiment, the hinge cover 165 may include a curved surface.

Hereinafter, the operations of the first housing structure 110 and the second housing structure 120 and each area of the display 130 according to the operation state (e.g., an unfolded state (flat state) and a folded state (folded state)) of the electronic device 100 are described. In an embodiment, in a case where the electronic device 100 is in an unfolded state (flat state) (e.g., the state of FIG. 1A), the first housing structure 110 and the second housing structure 120 form an angle of 180 degrees, and the first area 131a and the second area 131b of the display may be arranged to face the same direction. In addition, the folding area 131c may form the same plane as the first area 131a and the second area 131b.

In an embodiment, in a case where the electronic device 100 is in a folded state (e.g., the state of FIG. 1B), the first housing structure 110 and the second housing structure 120 may be arranged to face each other. The first area 131a and the second area 131b of the display 130 may form a narrow angle (e.g., between 0 degree and 10 degrees) with each other, and may face each other. At least a part of the folding area 131c may be formed as a curved surface having a predetermined curvature.

In an embodiment, in a case where the electronic device 100 is in an intermediate state, the first housing structure 110 and the second housing structure 120 may be arranged to form a certain angle with each other. The first area 131a and the second area 131b of the display 130 may form an angle greater than that in a folded state and smaller than that in an unfolded state. At least a part of the folding area 131c may be formed as a curved surface having a predetermined curvature, and the curvature of the curved surface may be smaller than that in a folded state.

Figure 2A:
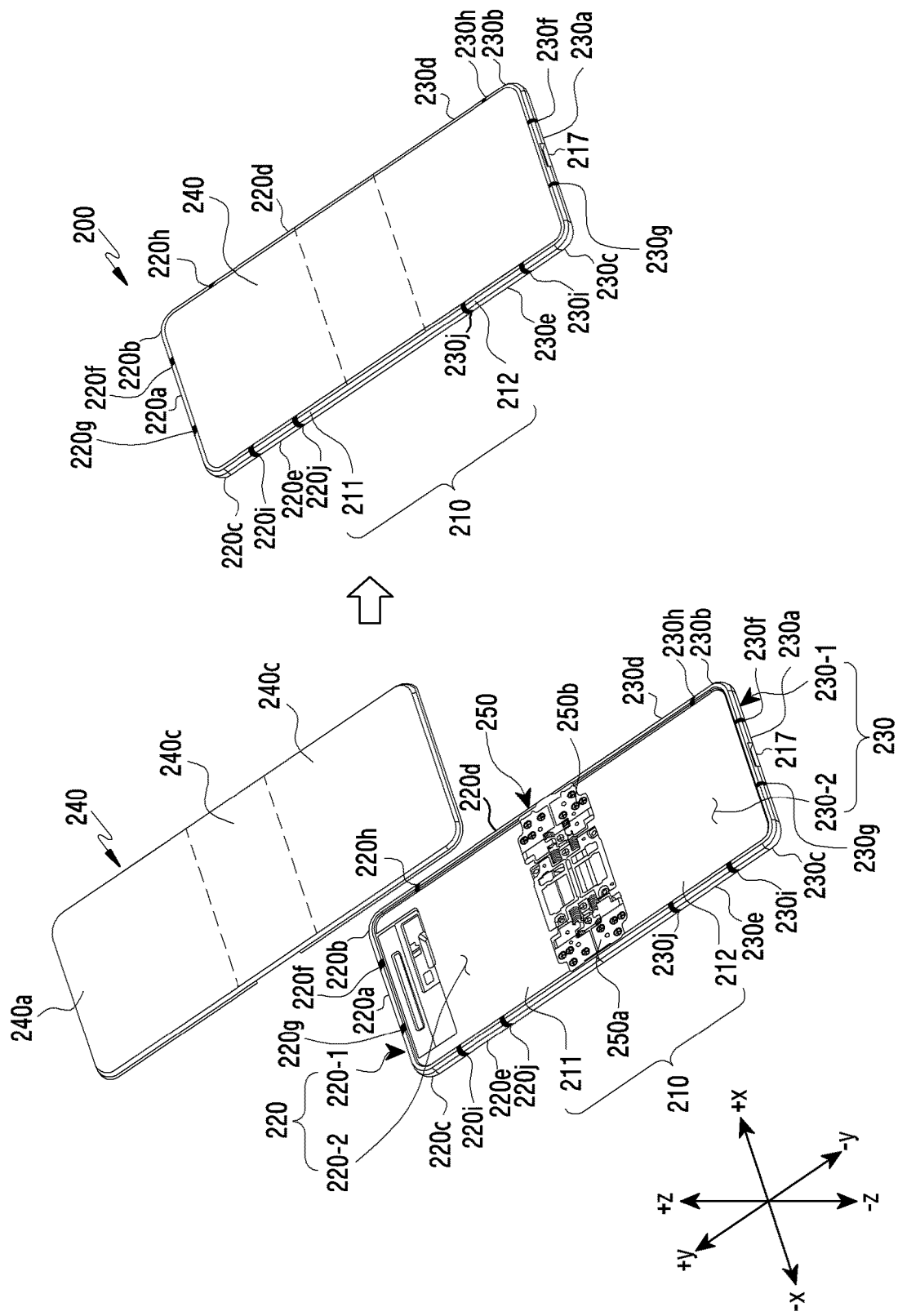
FIG. 2A illustrates an exploded view and an unfolded state of an electronic device according to an embodiment.
Figure 2B:
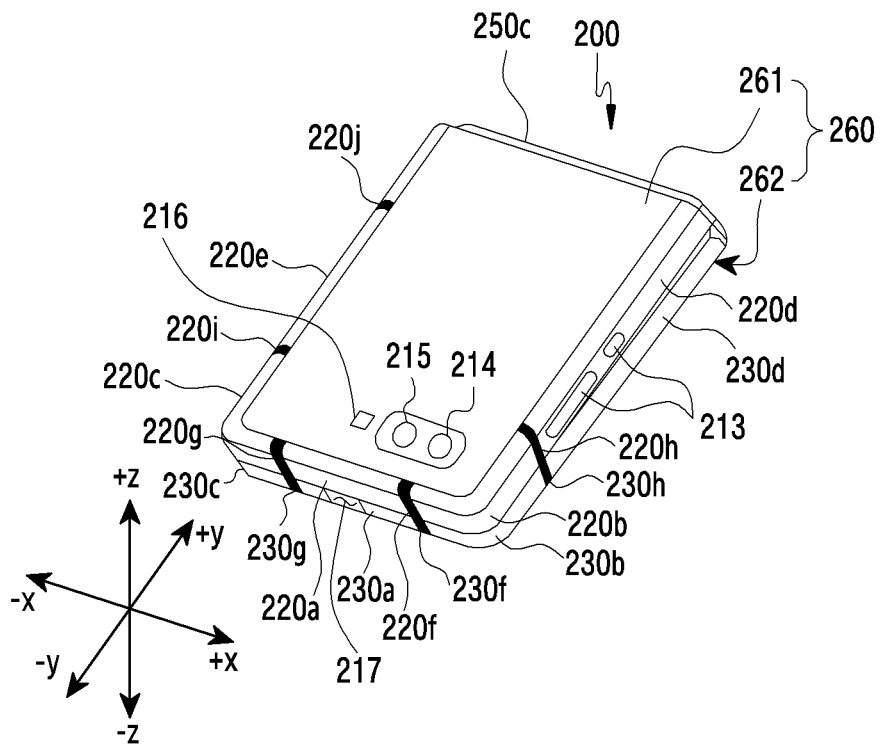
FIG. 2B illustrates a folded state of the electronic device of FIG. 2A.
Figure 2B:
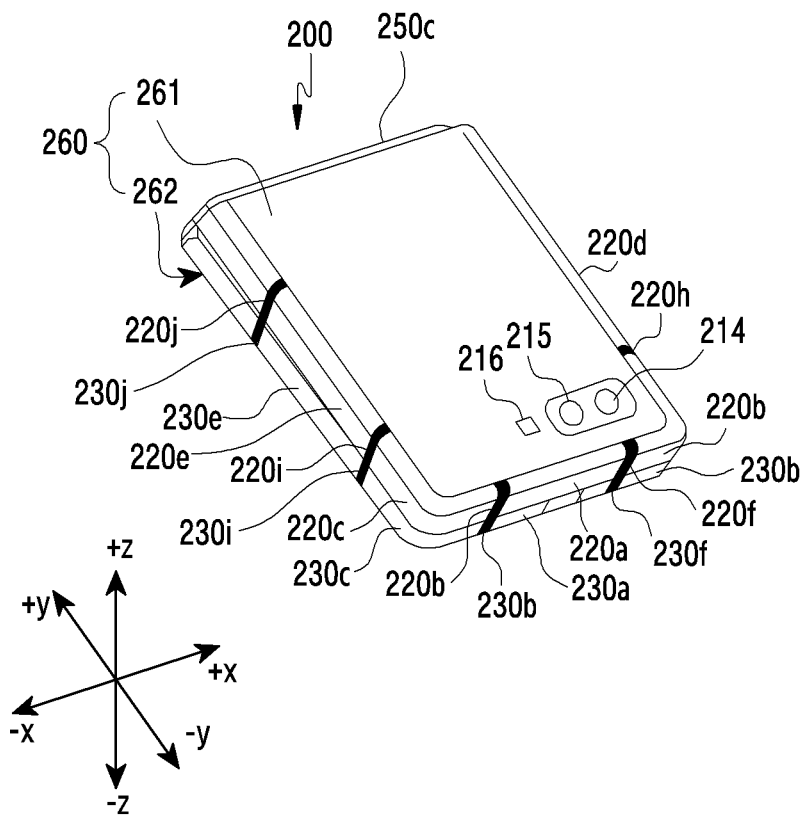

FIG. 2A illustrates an exploded view and an unfolded state of an electronic device according to an embodiment. FIG. 2B illustrates a folded state of the electronic device of FIG. 2A.

FIG. 2A illustrates an exploded view and an unfolded state of an electronic device 200 according to an embodiment, and FIG. 2B illustrates a folded state of the electronic device 200 of FIG. 2A.

Referring to FIG. 2A and FIG. 2B, the electronic device 200 according to an embodiment may include a foldable housing 210 (or "housing") including a first housing 211 and a second housing 212, a first side surface member 220, a second side surface member 230, a flexible display 240, a connection structure 250, and/or a cover 260 (or "rear cover").

According to an embodiment, the first housing 211 and the second housing 212 may form an inner space in which electronic components included in the electronic device 200 may be arranged. In an embodiment, a plurality of electronic components configured to perform various functions of the electronic device 200 may be arranged in the inner space of the first housing 211 and the second housing 212. For example, electronic components such as a front surface camera, rear surface cameras 214 and 215, an interface, a receiver, or a sensor module may be arranged in the inner space of the first housing 211 and the second housing 212. According to an embodiment, a part of the electronic components may be viewed in the front surface of the electronic device 200 via at least one opening or recess arranged on the flexible display 240.

In an example (e.g., see FIG. 2A), when the electronic device 200 is in an unfolded state, the first housing 211 and the second housing 212 may be arranged parallel to each other. In another example (e.g., see FIG. 4), when the electronic device 200 is in a folded state, the first housing 211 may rotate (or pivot) with respect to the second housing 212 via the connection structure 250, and as a result, one surface of the first housing 211 and one surface of the second housing 212 may be arranged to face each other.

According to an embodiment, a recess configured to receive the flexible display 240 may be disposed in the first housing 211 and the second housing 212. For example, the flexible display 240 may be stably seated in the recess to be supported by the first side surface member 220 and/or the second side surface member 230 arranged between the flexible display 240 and the first housing 211 and the second housing 212.

According to an embodiment, the first side surface member 220 may form a side surface of the first housing 211 of the foldable housing 210. In an example, the first side surface member 220 may include a first structure 220-1 forming a side surface of the first housing 211 and/or a second structure 220-2 which provide a space in which electronic components arranged in the first housing 211 are to be arranged. In an example, the first structure 220-1 of the first side surface member 220 may include a plurality of conductive portions (e.g., 220a, 220b, 220c, 220d, and 220e) having conductivity and a plurality of non-conductive portions (e.g., 220f, 220g, 220h, 220i, and 220j) (or "segmented areas") arranged among the plurality of conductive portions. Some of the plurality of non-conductive portions may be omitted. In an embodiment, the first structure 220-1 and the second structure 220-2 may be integrally arranged or coupled to be arranged. As another example, the first structure 220-1 and the second structure 220-2 may include the same material or include materials different from each other.

In an example, the first structure 220-1 of the first side surface member 220 may include a first conductive portion 220a disposed on an upper end (e.g., the +y direction of FIG. 2A) of the side surface of the first housing 221, a second conductive portion 220b disposed in an area adjacent to one right end (e.g., the +x direction of FIG. 2A) of the first conductive portion 220a, a third conductive portion 220c disposed in an area adjacent to one left end (e.g., the −x direction of FIG. 2A) of the first conductive portion 220a, a fourth conductive portion 220d adjacent to the second conductive portion 220b and disposed on the right side surface (e.g., a side surface in the +x direction of FIG. 2A) of the first housing 211, and/or a fifth conductive portion 220e adjacent to the third conductive portion 220c and disposed on the left side surface (e.g., a side surface in the −x direction of FIG. 2A) of the first housing 211.

In another example, the plurality of non-conductive portions may include a first non-conductive portion 220f disposed between the first conductive portion 220a and the second conductive portion 220b, a second non-conductive portion 220g disposed between the first conductive portion 220a and the third conductive portion 220c, a third non-conductive portion 220h disposed between the second conductive portion 220b and the fourth conductive portion 220d, a fourth non-conductive portion 220i disposed between the third conductive portion 220c and one end of the fifth conductive portion 220e, and/or a fifth non-conductive portion 220j disposed at the other end of the fifth conductive portion 220e. The plurality of non-conductive portions described above may be arranged among the first conductive portion 220a, the second conductive portion 220b, the third conductive portion 220c, the fourth conductive portion 220d, and/or the fifth conductive portion 220e to insulate the plurality of conductive portions, and accordingly, the first structure 220-1 of the first side surface member 220 may be segmented into five areas. The electronic device 200 according to an embodiment may use at least one among the first conductive portion 220a, the second conductive portion 220b, the third conductive portion 220c, the fourth conductive portion 220d, and the fifth conductive portion 220e, which are insulated, as an antenna radiator. In an example, the plurality of non-conductive portions may be filled with a non-conductive material such as synthetic resin.

In an example, the second structure 220-2 of the first side surface member 220 may be configured of a non-metal material and/or a metal material having a predetermined rigidity so as to support the electronic components (e.g., the flexible display 240 and a printed circuit board). In an example, at least a partial area (e.g., a first area 240a) of the flexible display 240 may be disposed on one surface (e.g., a surface in the +z direction of FIG. 2A) of the second structure 220-2, a printed circuit board may be disposed on another surface (e.g., a surface in the −z direction of FIG. 2A) facing a direction opposite to the one surface.

According to an embodiment, the second side surface member 230 may form a side surface of the second housing 212 of the foldable housing 210. In an example, the second side surface member 230 may include a third structure 230-1 forming a side surface of the second housing 212 and a fourth structure 230-2 configured to provide a space in which electronic components arranged in the second housing 212 are to be arranged. In an example, the third structure 230-1 of the second side surface member 230 may include a plurality of conductive portions (e.g., 230a, 230b, 230c, 230d, and 230e) having conductivity, and a plurality of non-conductive portions (e.g., 230f, 230g, 230h, 230i, and 230j) (or "segmented areas") arranged among the plurality of conductive portions. In an embodiment, the third structure 230-1 and the fourth structure 230-2 may be integrally formed or coupled to be arranged. As another example, the third structure 230-1 and the fourth structure 230-2 may include the same material or materials different from each other.

In an example, the third structure 230-1 of the second side surface member 230 may include a sixth conductive portion 230a disposed at a lower end (e.g., the −y direction of FIG. 2A) of a side surface of the second housing 212, a seventh conductive portion 230b disposed in an area adjacent to one end of a right side (e.g., the +x direction of FIG. 2A) of the sixth conductive portion 230a, an eighth conductive portion 230c disposed in an area adjacent to one end of a left side (e.g., the −x direction of FIG. 2A) of the sixth conductive portion 230a, a ninth conductive portion 230d adjacent to the seventh conductive portion 230b disposed at a right side surface (e.g., a side surface in the +x direction of FIG. 2A) of the second housing 212, and/or a tenth conductive portion 230e adjacent to the eighth conductive portion 230c and disposed at a left side surface (e.g., a side surface in the −x direction of FIG. 2A) of the second housing 212.

In another example, the plurality of non-conductive portions may include a sixth non-conductive portion 230f disposed between the sixth conductive portion 230a and the seventh conductive portion 230b, a seventh non-conductive portion 230g disposed between the sixth conductive portion 230a and the eighth conductive portion 230c, an eighth non-conductive portion 230h disposed between the seventh conductive portion 230b and the ninth conductive portion 230d, a ninth non-conductive portion 230i disposed between the eighth conductive portion 230c and one end of the tenth conductive portion 230e, and/or a tenth non-conductive portion 230j disposed at the other end of the tenth conductive portion 230e. The plurality of non-conductive portions described above are arranged among the sixth conductive portion 230a, the seventh conductive portion 230b, the eighth conductive portion 230c, the ninth conductive portion 230d, and/or the tenth conductive portion 230e to insulate the plurality of conductive portions, and accordingly, the third structure 230-1 of the second side surface member 230 may be segmented into five areas. The electronic device 200 according to an embodiment may use at least one among the sixth conductive portion 230a, the seventh conductive portion 230b, the eighth conductive portion 230c, the ninth conductive portion 230d, and the tenth conductive portion 230e, which are insulated, as an antenna radiator.

According to an embodiment, when the electronic device 200 is in a folded state, the first conductive portion 220a of the first side surface member 220 may be disposed at a position corresponding to the sixth conductive portion 230a of the second side surface member 230, and the second conductive portion 220b of the first side surface member 220 may be disposed at a position corresponding to the seventh conductive portion 230b of the second side surface member 230. According to an embodiment, when the electronic device 200 is in a folded state, the third conductive portion 220c may be disposed at a position corresponding to the eighth conductive portion 230c, the fourth conductive portion 220d may be disposed at a position corresponding to the ninth conductive portion 230d, and the fifth conductive portion 220e may be disposed at a position corresponding to the tenth conductive portion 230e. The electronic device 200 according to an embodiment may reduce interference among the plurality of conductive portions used as an antenna radiator via the above-described arrangement structure.

In an example, the fourth structure 230-2 of the second side surface member 230 may be formed of a non-metal material and/or a metal material having a predetermined rigidity so as to support the electronic components (e.g., the flexible display 240 and a printed circuit board). In an example, at least a partial area (e.g., a second area 240b) of the flexible display 240 may be disposed on one surface (e.g., a surface in the +z direction of FIG. 2A) of the fourth structure 230-2, and a printed circuit board may be disposed on another surface (e.g., a surface in the −z direction of FIG. 2A) facing a direction opposite to the one surface.

According to an embodiment, the flexible display 240 may be disposed in the first housing 211 and the second housing 212 to configure a front surface (e.g., a surface in the +z direction of FIG. 3) of the electronic device 200 when the electronic device 200 is in an unfolded state. For example, the flexible display 240 may be disposed to extend from one area of the first housing 211 to at least one area of the second housing 212 across the connection structure 250. According to an embodiment, the flexible display 240 may be stably seated in a recess formed by the first housing 211 and the second housing 212 to be disposed in the first housing 211 and the second housing 212.

In an example, the flexible display 240 may include a first area 240a corresponding to at least one area of the first housing 211, a second area 240b corresponding to at least one area of the second housing 212, or a folding area 240c positioned between the first area 240a and the second area 240b and having flexible characteristics. The flexible display 240 is not limited to the above-described embodiment, and according to another embodiment, at least one among the first area 240a, the second area 240b, or the folding area 240c of the flexible display 240 may be configured to have flexible characteristics. In an example, when the electronic device 200 is in an unfolded state, the first area 240a, the folding area 240c, and the second area 240b may be arranged in parallel to face the same direction (e.g., the +z direction of FIG. 3). As another example, when the electronic device 200 is in a folding state, at least a part of the folding area 240c may be disposed to be bended to allow the first area 240a and the second area 240b to face each other.

According to an embodiment, the connection structure 250 may connect the first housing 211 and the second housing 212. Accordingly, the second housing 212 may rotate with respect to the first housing 211 within a designated rotation range, or on the contrary, the first housing 211 may rotate with respect to the second housing 212 within a designated rotation range. In an example, a recess is disposed in an area in which the first housing 211 and the second housing 212 are connected to allow the connection structure 250 to be disposed between the first housing 211 and the second housing 212. As an example, the above-described recess may be disposed in a groove shape having a predetermined curvature, but is not limited thereto.

According to an embodiment, the connection structure 250 may be a hinge assembly. In an example, the hinge assembly may include at least one hinge structure 250a and 250b and a hinge housing 250c. The at least one hinge structure 250a and 250b may include a plurality of gears, a plurality of gear shafts, and/or a plurality of rotational side surface members (brackets), and may be connected to the first housing 211 and/or the second housing 212 to allow the first housing 211 and/or the second housing 212 to rotate within a designated rotation range. As an embodiment, the hinge housing 240c may be exposed to the outside of the electronic device 200 or be covered by the foldable housing 210, depending on the state of the electronic device 200. In an example (e.g., see FIG. 2A), when the electronic device 200 is in an unfolded state, the hinge housing 240c may be covered by the foldable housing 210 to be prevented from being exposed to the outside of the electronic device 200. In another example (e.g., see FIG. 2B), when the electronic device 200 is in a folded state, the hinge housing 240c may be exposed to the outside of the electronic device 200 by the rotation of the first housing 211 and the second housing 212.

According to an embodiment, the cover 260 may be disposed at lower ends (e.g., the −z direction of FIG. 2A) of the first housing 211 and the second housing 212 to form a rear surface of the electronic device 200. As an example, the cover 260 may include a first cover 261 coupled to a lower end (e.g., the −z direction of FIG. 2A) of the first housing 211, and a second cover 262 coupled to a lower end of the second housing 212. As another example, the first cover 261 and the first housing 211 may be integrally formed. As still another example, the second cover 262 and the second housing 212 may be integrally formed.

The electronic device 200 according to an embodiment may further include a sensor module, a key input device 213, camera modules 214, 215, and 216, and/or a connector hole 217.

According to an embodiment, the key input device 213 may be disposed on at least one side surface of the foldable housing 210. As an example (e.g., see FIG. 2B), the key input device 213 may be disposed on one side surface of the first housing 211. In another example, the key input device 317 may be disposed on one side surface of the second housing 212. In another embodiment, the electronic device 200 may not include a part or all of the above-described key input device 213, and the key input device 213, which is not included, may be implemented on the flexible display 240 in another form such as a soft key.

According to an embodiment, the camera modules 214, 215, and 216 may include a first camera device (or "front camera") facing the flexible display 240, second camera devices 214 and 215 (or "rear camera") arranged on the cover 260, and/or a flash 216. For example, the camera devices 214 and 215 may include at least one lens, an image sensor, and/or an image signal processor. For example, the flash 216 may include a light emitting diode or a xenon lamp.

According to an embodiment, the connector hole 217 may receive a connector configured to transmit/receive power and/or data to/from an external electronic device, and/or a connector configured to transmit/receive an audio signal to/from the external electronic device. For example, the connector hole 217 may include a USB connector or an earphone jack (or "earphone interface").

Figure 3:
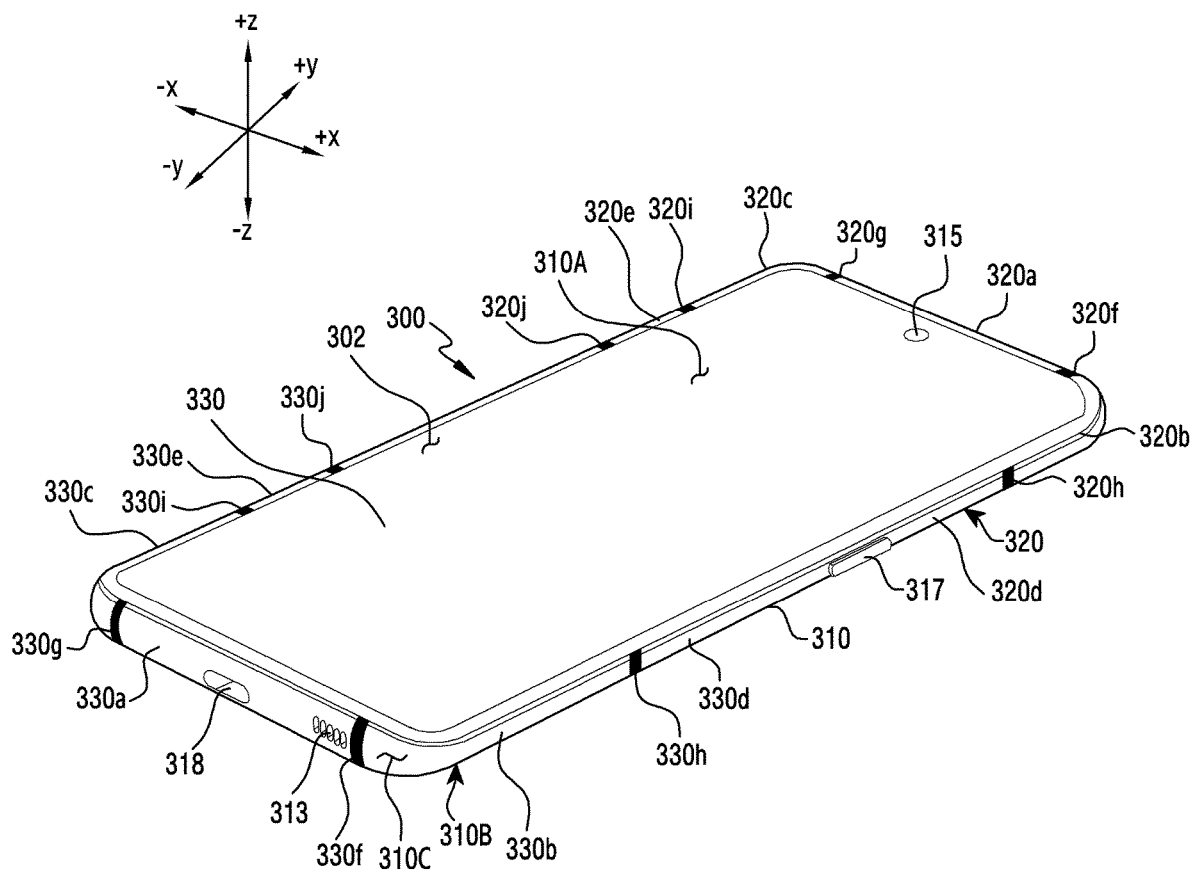
FIG. 3 is a perspective view of an electronic device viewed from one side thereof according to another embodiment.

FIG. 3 is a perspective view of an electronic device 300 viewed from one side of the electronic device 300 according to another embodiment. FIG. 3 illustrates the electronic device 300 of a bar type.

Referring to FIG. 3, the electronic device 300 according to another embodiment may include a housing 310, an audio module 313, a camera module 315, a key input device 317, a connector hole 318, and/or a display 330.

According to an embodiment, the housing 310 may include a first surface (or a front surface) 310A, a second surface (or a rear surface) 310B, and a side surface (or a side wall) 310C configured to surround a space between the first surface 310A and the second surface 310B. According to another embodiment, the housing 310 may refer to a structure forming at least a part among the first surface 310A, the second surface 310B, and/or the side surface 310C of FIG. 3.

According to an embodiment, the first surface 310A may be configured by a front plate 302 (e.g., a polymer plate or a glass plate including various coating layers) of which at least a part is substantially transparent. According to an embodiment, the front plate 302 may include a curved surface portion which extends seamlessly by being bended toward the rear plate from the first surface 310A in at least one side edge portion.

According to an embodiment, the second surface 310B may be configured by a substantially opaque rear plate. In an example, the rear plate may be configured of coated or tinted glass, ceramic, polymer, metal (e.g., aluminum, stainless steel (STS), or magnesium), or a combination of at least two of the above-described materials. According to an embodiment, the rear plate may include a curved surface portion which extends seamlessly by being bended toward the front plate 302 from the second surface 310B in at least one side edge portion.

According to an embodiment, the side surface 310C may be coupled to the front plate 302 and the rear plate and may be configured by the side surface member 320 including metal and/or polymer. According to another embodiment, the rear plate and the side surface member 320 may be integrally formed and include the same material (e.g., a metal material such as aluminum).

According to an embodiment, the side surface member 320 may include a plurality of conductive portions (e.g., 320a, 320b, 320c, 320d, 320e, 330a, 330b, 330c, 330d, and 330e) having conductivity and/or a plurality of non-conductive portions (e.g., 320f, 320g, 320h, 320i, 320j, 330f, 330g, 330h, 330i, and 330j) (or "segmented areas") arranged among the plurality of conductive portions.

In an example, the plurality of conductive portions may include a first conductive portion 320a disposed on an upper end of a side surface (e.g., a side surface in the +y direction of FIG. 3) of the housing 310, a second conductive portion 320b disposed in an area adjacent to a right end (e.g., the +x direction of FIG. 3) of the first conductive portion 320a, a third conductive portion 320c disposed in an area adjacent to a left end (e.g., the −x direction of FIG. 3) of the first conductive portion 320a, a fourth conductive portion 320d adjacent to the second conductive portion 320b and disposed on a right side surface (e.g., a side surface in the +x direction of FIG. 3) of the housing 310, and/or a fifth conductive portion 320e adjacent to the third conductive portion 320c and disposed on a left side surface (e.g., a side surface in the −x direction of FIG. 3) of the housing 310.

In another example, the plurality of conductive portions may include a sixth conductive portion 330a disposed on a lower end of a side surface (e.g., a side surface in the −y direction of FIG. 3) of the housing 310, a seventh conductive portion 330b disposed in an area adjacent to a right end (e.g., the +x direction of FIG. 3) of the sixth conductive portion 330a, an eighth conductive portion 330c disposed in an area adjacent to a left end (e.g., the −x direction of FIG. 3) of the sixth conductive portion 330a, a ninth conductive portion 330d adjacent to the seventh conductive portion 330b and/or the fourth conductive portion 320d and disposed on a right side surface (e.g., a surface in the +x direction of FIG. 3) of the housing 310, and/or a tenth conductive portion 330e adjacent to the eighth conductive portion 330c and/or the fifth conductive portion 320e and disposed on a left side surface (e.g., a surface in the −x direction of FIG. 3) of the housing 310.

In an example, the plurality of non-conductive portions may include a first non-conductive portion 320f disposed between the first conductive portion 320a and the second conductive portion 320b, a second non-conductive portion 320g disposed between the first conductive portion 320a and the third conductive portion 320c, a third non-conductive portion 320h disposed between the second conductive portion 320b and the fourth conductive portion 320d, a fourth non-conductive portion 320i disposed between the third conductive portion 320c and one end of the fifth conductive portion 320e, and/or a fifth non-conductive portion 320j disposed at the other end of the fifth conductive portion 320e.

In another example, the plurality of non-conductive portions may include a sixth non-conductive portion 330f disposed between the sixth conductive portion 330a and the seventh conductive portion 330b, a seventh non-conductive portion 330g disposed between the sixth conductive portion 330a and the eighth conductive portion 330c, an eighth non-conductive portion 330h disposed between the seventh conductive portion 330b and the ninth conductive portion 330d, a ninth non-conductive portion 330i disposed between the eighth conductive portion 330c and one end of the tenth conductive portion 330e, and/or a tenth non-conductive portion 330j disposed at the other end of the tenth conductive portion 330e.

According to an embodiment, the plurality of non-conductive portions may be filled with a non-conductive material such as synthetic resin. In an example, the plurality of non-conductive portions (e.g., the first non-conductive portion 320f, the second non-conductive portion 320g, the third non-conductive portion 320h, the fourth non-conductive portion 320i, and the fifth non-conductive portion 320j) may be arranged among the first conductive portion 320a, the second conductive portion 320b, the second conductive portion 320c, the fourth conductive portion 320d, and/or the fifth conductive portion 320e to insulate the plurality of conductive portions, and accordingly, the upper end area (e.g., an area in the +y direction of FIG. 3) of the side surface member 320 may be segmented into five areas. In another example, the plurality of non-conductive portions (e.g., the sixth non-conductive portion 330f, the seventh non-conductive portion 330g, the eighth non-conductive portion 330h, the ninth non-conductive portion 330i, and the tenth non-conductive portion 330j) may be arranged among the sixth conductive portion 330a, the seventh conductive portion 330b, the eighth conductive portion 330c, the ninth conductive portion 330d, and/or the tenth conductive portion 330e to insulate the plurality of conductive portions, and accordingly, the lower end area (e.g., an area in the -y direction of FIG. 3) of the side surface member 320 may be segmented into five areas.

According to an embodiment, the electronic device 300 may use at least one among the first conductive portion 320a, the second conductive portion 320b, the third conductive portion 320c, the fourth conductive portion 320d, and/or the fifth conductive portion 320e, which are insulated, as an antenna radiator. According to another embodiment, the electronic device 300 may use at least one among the sixth conductive portion 330a, the seventh conductive portion 330b, the eighth conductive portion 330c, the ninth conductive portion 330d, and/or the tenth conductive portion 330e, which are insulated, as an antenna radiator. For example, the plurality of conductive portions may be electrically connected to a wireless communication circuit disposed in the housing 310, and the wireless communication circuit may transmit RF signals of a designated frequency band to the plurality of conductive portions or receive RF signals from the plurality of conductive portions.

According to an embodiment, the audio module 313 may include a microphone hole and a speaker hole 313. A microphone configured to acquire external sound may be disposed in the microphone hole, and in an embodiment, a plurality of microphones may be arranged to detect a direction of sound. In an embodiment, the speaker hole and the microphone hole may be implemented as one hole, or a speaker may be included without a speaker hole (e.g., piezo speaker). The speaker hole 313 may include an external speaker hole and a receiver hole for a call.

According to an embodiment, the camera module 315 may include a first camera device 315 disposed on the first surface 310A, a second camera device disposed on the second surface 310B, and/or a flash of the electronic device 300. The above-described camera devices 315 may include one or more lenses, an image sensor, and/or an image signal processor. For example, the flash may include a light emitting diode or a xenon lamp. In an embodiment, two or more lenses (infrared camera, wide-angle, and telephoto lenses) and image sensors may be arranged on one surface of the electronic device 300.

According to an embodiment, the key input device 317 may be disposed on the side surface 310C of the housing 310. In another embodiment, the electronic device 300 may not include a part or all of the above-described key input device 317, and the key input device 317, which is not included, may be implemented on the display 330 in another form such as a soft key.

According to an embodiment, the connector hole 318 may accommodate a connector configured to transmit/receive power and/or data to/from an external electronic device, and/or a connector configured to transmit/receive an audio signal to/from an external electronic device. For example, the connector hole 318 may include a USB connector or an earphone jack.

According to an embodiment, the display 330 may be exposed via a substantial portion of the front plate 302. In an example, the edge of the display 330 may be configured to be substantially the same as an adjacent outer shape (e.g., a curved surface) of the front plate 302. In another embodiment, the gap between the border of the display 330 and the border of the front plate 302 may be configured to be substantially the same, so as to expand the area in which the display 330 is exposed. In another embodiment, a recess or an opening may be disposed on a part of the screen display area of the display 330, and may include other electronic components aligned with the recess or the opening, for example, a camera module 315, a proximity sensor, or an illuminance sensor.

Figure 4:
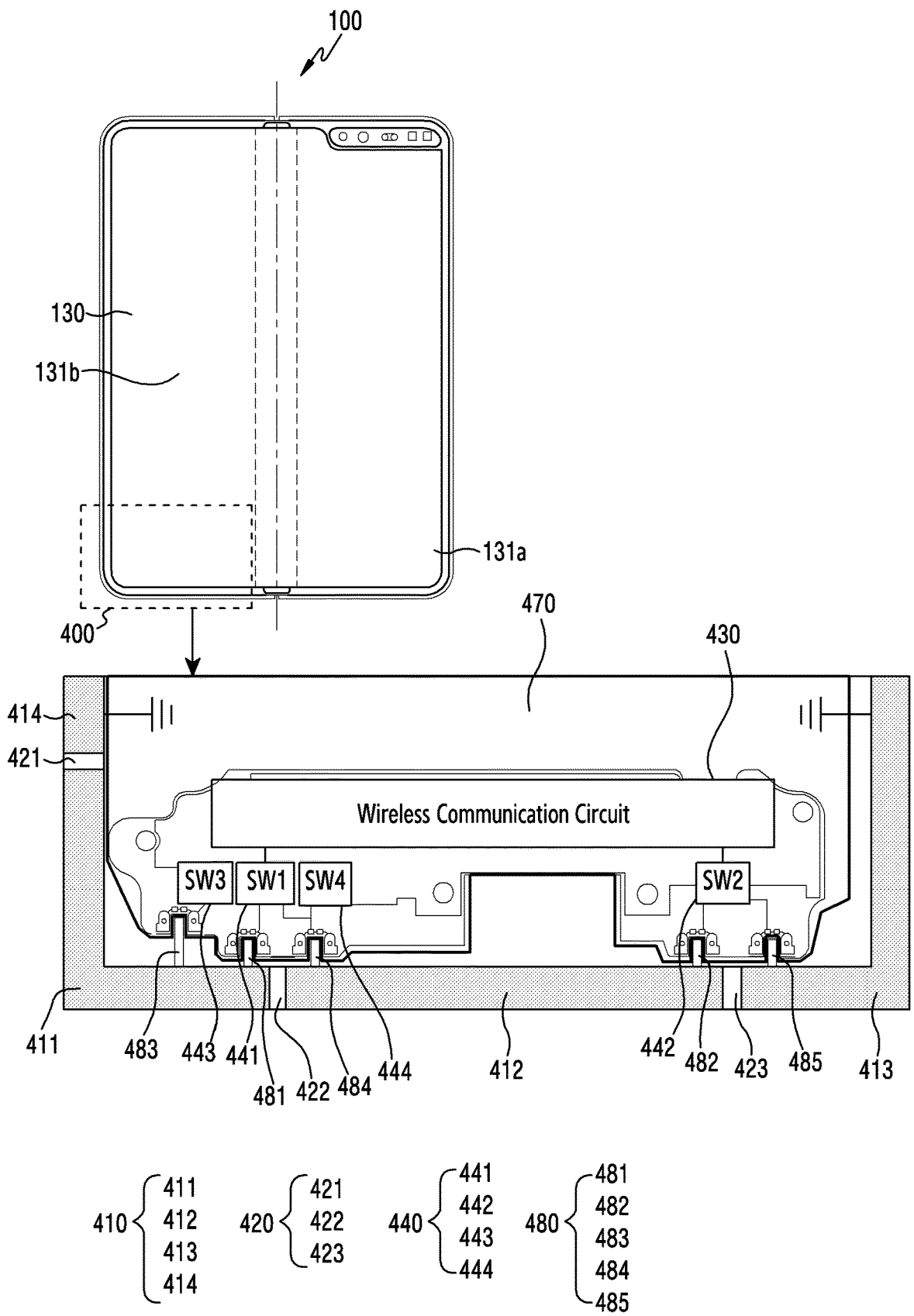
FIG. 4 illustrates an electronic device including an antenna structure according to an embodiment.

FIG. 4 illustrates an electronic device including an antenna structure according to an embodiment. The same reference numerals have been used for the same or substantially the same components as those described above, and the overlapping descriptions will be omitted.

Referring to FIG. 4, an electronic device 100 according to an embodiment may include an antenna structure (or frame structure) 400 in the electronic device 100. The antenna structure 400 according to an embodiment may be disposed in a first area 131a and/or a second area 131b. In an embodiment of FIG. 4, the antenna structure 400 is described to be disposed in the second area 131b.

The antenna structure 400 according to an embodiment may include a wireless communication circuit 430, a plurality of switching circuits 440, a plurality of conductive portions 410, a printed circuit board (PCB) 470 including a ground layer, and a plurality of insulating portions 420. The plurality of insulating portions 420 according to an embodiment may be filled with a non-conductive material such as synthetic polymer.

The wireless communication circuit 430 according to an embodiment may be disposed in the electronic device 100. The wireless communication circuit 430 according to an embodiment may be electrically connected to the plurality of conductive portions 410. The wireless communication circuit 430 according to an embodiment may transmit a signal of a designated frequency band to the plurality of conductive portions 410, or may receive a signal of a designated frequency band from the plurality of conductive portions 410.

The plurality of conductive portions 410 according to an embodiment may form at least a part of the housing of the electronic device 100. A first conductive portion 411 and a second conductive portion 412 according to an embodiment may be spaced apart from each other by a second insulating portion 422. The second conductive portion 412 and a third conductive portion 413 according to an embodiment may be spaced apart from each other by a third insulating portion 423. The plurality of conductive portions 410 according to an embodiment may be fed with power from the wireless communication circuit 430 to operate as antenna radiators.

In an example, the electronic device 100 may include a sensor module, and thus may produce data values or electric signals corresponding to an internal operation state or an external environment state. In an example, the electronic device 100 may further include a sensor module, for example, at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor. The electronic device 100 according to an embodiment may detect the proximity of a human body via a grip sensor. The grip sensor according to an embodiment may be disposed at a first point at which the first conductive portion 411 is connected to the third switching circuit 443 or a second point at which the first conductive portion 411 is connected to the first switching circuit 441. According to another embodiment, the grip sensor may be disposed at a position symmetrical to the first point or the second point (e.g., the first side surface member 113 of FIG. 1A), but is not limited thereto.

For example, the electric device 100 may detect the proximity of a human body with respect to the first insulating portion 421 via a grip sensor, but the portion which detects the proximity of a human body by a grip sensor is not limited thereto.

At least a part of the plurality of switching circuits 440 according to an embodiment may be electrically connected to the wireless communication circuit 430. At least a part of the plurality of switching circuits 440 according to an embodiment may be electrically connected to the plurality of conductive portions 410. The electronic device 100 according to an embodiment may control the electrical connection between the wireless communication circuit 430 and the plurality of conductive portions 410 via at least a part of the plurality of switching circuits 440. For example, the wireless communication circuit 430 may be electrically connected to the first conductive portion 411 and/or the second conductive portion 412 by a first switching circuit 441. In an example, the wireless communication circuit 430 may be electrically connected to the second conductive portion 412 and/or the third conductive portion 413 by a second switching circuit 442.

The electronic device 100 according to an embodiment may include a plurality of connection portions 480. The plurality of connection portions 480 according to an embodiment may be a part of the plurality of conductive portions 410. A plurality of connection portions 480 according to another embodiment may include a connection structure (e.g., a C-clip, a pogo pin, and a screw) disposed on the printed circuit board 470, but is not limited thereto. For example, the first conductive portion 411 may be electrically connected to the third switching circuit 443 via a third connection portion 483. The second conductive portion 412 may be electrically connected to a fourth switching circuit 444 via a fourth connection portion 484, and may be electrically connected to the second switching circuit 442 via a second connection portion 482.

According to an embodiment, the third conductive portion 413 and/or a fourth conductive portion 414 may be connected to the ground layer included in the printed circuit board 470.

The plurality of switching circuits 440 according to an embodiment may include internal elements. At least a part of the plurality of switching circuits 440 according to an embodiment may control the internal elements to change electrical paths related to the plurality of conductive portions 410. The detailed description for the change of the electrical paths via the plurality of switching circuits 440 will be described later.

FIG. 5A to FIG. 5E illustrate connection relations between a wireless communication circuit and conductive portions according to various embodiments.

Referring to FIG. 5A to FIG. 5E, according to various embodiments, electrical connections between the wireless communication circuit 430 and the plurality of conductive portions 410 may be controlled by the plurality of switching circuits 440.

Figure 5A:
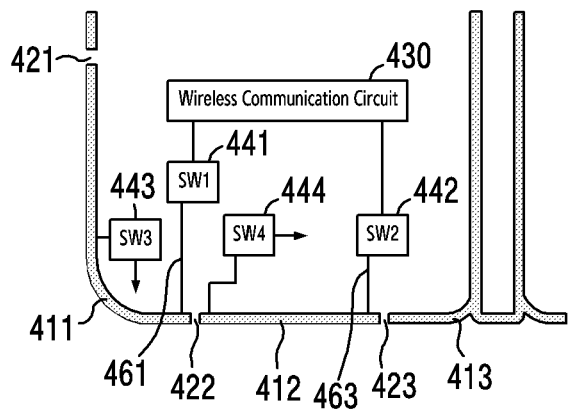
FIG. 5A to FIG. 5E illustrate connection relations between a wireless communication circuit and conductive portions according to various embodiments.

Referring to FIG. 5A, according to an embodiment, the wireless communication circuit 430 may be electrically connected to the first conductive portion 411 via the first switching circuit 441 and a first feeding line 461. According to an embodiment, in a first mode, the wireless communication circuit 430 may be electrically connected to the first conductive portion 411 by the first switching circuit 441, and may transmit or receive a signal of a first frequency band (e.g., a low-band frequency) via the first conductive portion 411 by feeding power to the first conductive portion 411. According to an embodiment, the wireless communication circuit 430 may be electrically connected to the second conductive portion 412 via the second switching circuit 442 and a third feeding line 463. The wireless communication circuit 430 may be electrically connected to the second conductive portion 412 by the second switching circuit 442, and may transmit or receive a signal of a second frequency band (e.g., a mid-band frequency, a high-band frequency, or an ultra-high-band frequency) via the second conductive portion 412 by feeding power to the second conductive portion 412.

Figure 5B:
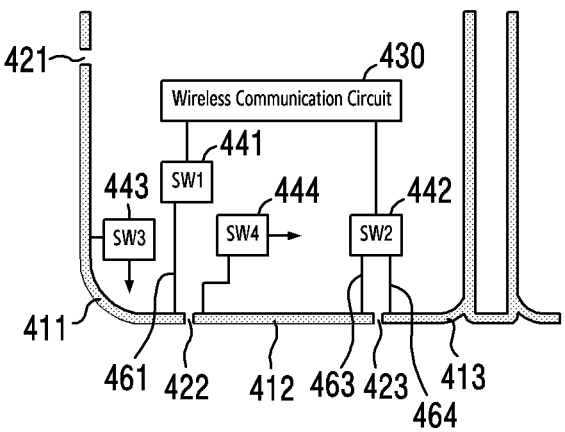

Referring to FIG. 5B, according to an embodiment, the wireless communication circuit 430 may be electrically connected to the first conductive portion 411 via the first switching circuit 441 and the first feeding line 461. According to an embodiment, in a second mode, the wireless communication circuit 430 may be electrically connected to the first conductive portion 411 by the first switching circuit 441, and may transmit or receive a signal of the first frequency band (e.g., a low-band frequency) via the first conductive portion 411 by feeding power to the first conductive portion 411. According to an embodiment, the wireless communication circuit 430 may be electrically connected to the second conductive portion 412 via the third feeding line 463. The wireless communication circuit 430 may be electrically connected to the third conductive portion 413 via a fourth feeding line 464. The wireless communication circuit 430 may be electrically connected to the second conductive portion 412 and the third conductive portion 413 by the second switching circuit 442, and may transmit or receive a signal of a second frequency band (e.g., a mid-band frequency, a high-band frequency, or an ultra-high-band frequency) via the second conductive portion 412 and the third conductive portion 413 by feeding power to the second conductive portion 412 and the third conductive portion 413.

Figure 5C:
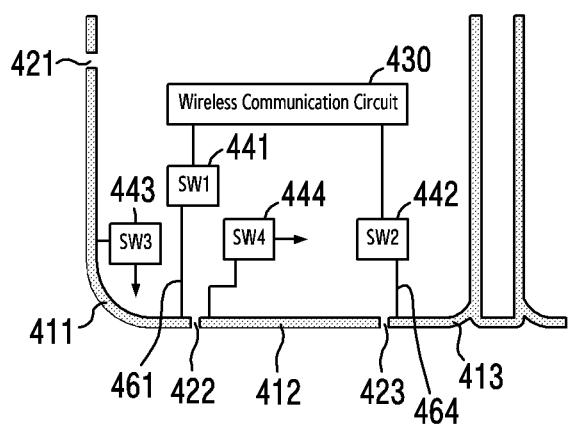

Referring to FIG. 5C, according to an embodiment, the wireless communication circuit 430 may be electrically connected to the first conductive portion 411 via the first switching circuit 441 and the first feeding line 461. According to an embodiment, in a third mode, the wireless communication circuit 430 may be electrically connected to the first conductive portion 411 by the first switching circuit 441, and may transmit or receive a signal of the first frequency band (e.g., a low-band frequency) via the first conductive portion 411 by feeding power to the first conductive portion 411. According to an embodiment, the wireless communication circuit 430 may be electrically connected to the third conductive portion 413 via the second switching circuit 442 and the fourth feeding line 464. The wireless communication circuit 430 may be electrically connected to the third conductive portion 413 by the second switching circuit 442, and may transmit or receive a signal of the second frequency band (e.g., a mid-band frequency, a high-band frequency, or an ultra-high-band frequency) via the third conductive portion 413 by feeding power to the third conductive portion 413.

Figure 5D:
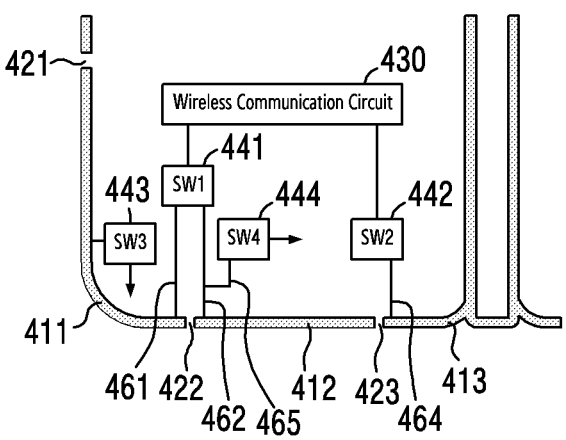

Referring to FIG. 5D, according to an embodiment, the wireless communication circuit 430 may be electrically connected to the first conductive portion 411 via the first switching circuit 441 and the first feeding line 461. The wireless communication circuit 430 may be electrically connected to the second conductive portion 412 via the first switching circuit 441 and the second feeding line 462. According to an embodiment, the fourth switching circuit 444 may be electrically connected to the second feeding line 462 via a fifth feeding line 465. According to an embodiment, in a fourth mode, the wireless communication circuit 430 may be electrically connected to the first conductive portion 411 and the second conductive portion 412 by the first switching circuit 441, and may transmit or receive a signal of the first frequency band (e.g., a low-band frequency) via the first conductive portion 411 and the second conductive portion 412 by feeding power to the first conductive portion 411 and the second conductive portion 412. According to an embodiment, the wireless communication circuit 430 may be electrically connected to the third conductive portion 413 via the second switching circuit 442 and the fourth feeding line 464. The wireless communication circuit 430 may be electrically connected to the third conductive portion 413 by the second switching circuit 442, and feed power to the third conductive portion 413 to transmit or receive a signal of the second frequency band (e.g., a mid-band frequency, a high-band frequency, or an ultra-high-band frequency) via the third conductive portion 413. The third switching circuit 443 according to an embodiment may control an internal element to have an impedance which is electrically close to a short circuit. The third switching circuit 443 according to an embodiment may have an impedance which is electrically close to a short circuit, and may thus change electrical paths connected to the first conductive portion 411 via the first switching circuit 441 from the wireless communication circuit 430. For example, the third switching circuit 443 may be electrically connected to a ground disposed in the printed circuit board (e.g., the printed circuit board 470 in FIG. 4).

Figure 5E:
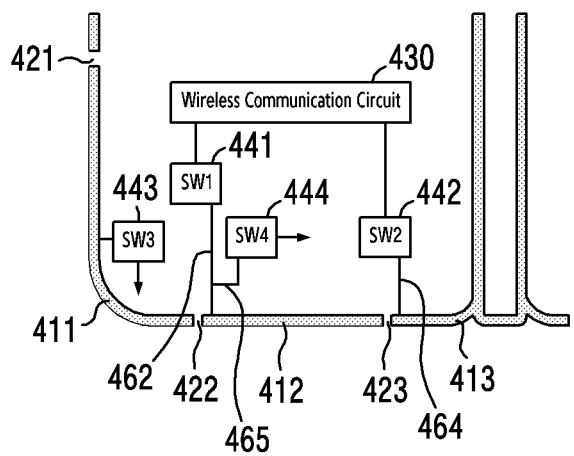

Referring to FIG. 5E, according to an embodiment, the wireless communication circuit 430 may be electrically connected to the second conductive portion 412 via the first switching circuit 441 and the second feeding line 462. According to an embodiment, the fourth switching circuit 444 may be electrically connected to the second feeding line 462 via the fifth feeding line 465. According to an embodiment, in a fifth mode, the wireless communication circuit 430 may be electrically connected to the second conductive portion 412 by the first switching circuit 441, and may transmit or receive a signal of the first frequency band (e.g., a low-band frequency) via the second conductive portion 412 by feeding power to the second conductive portion 412. According to an embodiment, the wireless communication circuit 430 may be electrically connected to the third conductive portion 413 via the second switching circuit 442 and the fourth feeding line 464. The wireless communication circuit 430 may be electrically connected to the third conductive portion 413 by the second switching circuit 442, and may transmit or receive a signal of the second frequency band (e.g., a mid-band frequency, a high-band frequency, or an ultra-high-band frequency) via the third conductive portion 413 by feeding power to the third conductive portion 413. The fourth switching circuit 444 according to an embodiment may control an internal element to change electrical paths connected to the second conductive portion 412 via the first switching circuit 441 from the wireless communication circuit 430. According to an embodiment, the fourth switching circuit 444 may be electrically connected to a ground disposed in the printed circuit board (e.g., the printed circuit board 470 of FIG. 4).

According to an embodiment, the third switching circuit 443 and/or the fourth switching circuit 444 may be connected to a ground disposed in the printed circuit board (e.g., the printed circuit board 470 in FIG. 4) by a control signal of the wireless communication circuit 430.

According to an embodiment, the wireless communication circuit 430 may be switched from the first mode to the fifth mode. According to an embodiment, in the process of switching from the first mode to the fifth mode, the wireless communication circuit 430 may include at least one among the second mode, the third mode, and the fourth mode. For example, after switching from the first mode to the fourth mode, the wireless communication circuit may be switched to the fifth mode. According to an embodiment, while the mode of the wireless communication circuit 430 is changed, the conductive portion 411, 412, 413, or 414 transmitting and/or receiving a signal of the first frequency band and the second frequency band may be changed. For example, in a case of being switched from the first mode to the fifth mode, the conductive portion transmitting/receiving a signal of the first frequency band may be switched from the first conductive portion 411 to the second conductive portion 412, and the conductive portion transmitting/receiving a signal of the second frequency band may be switched from the second conductive portion 412 to the third conductive portion 413.

Figure 6:
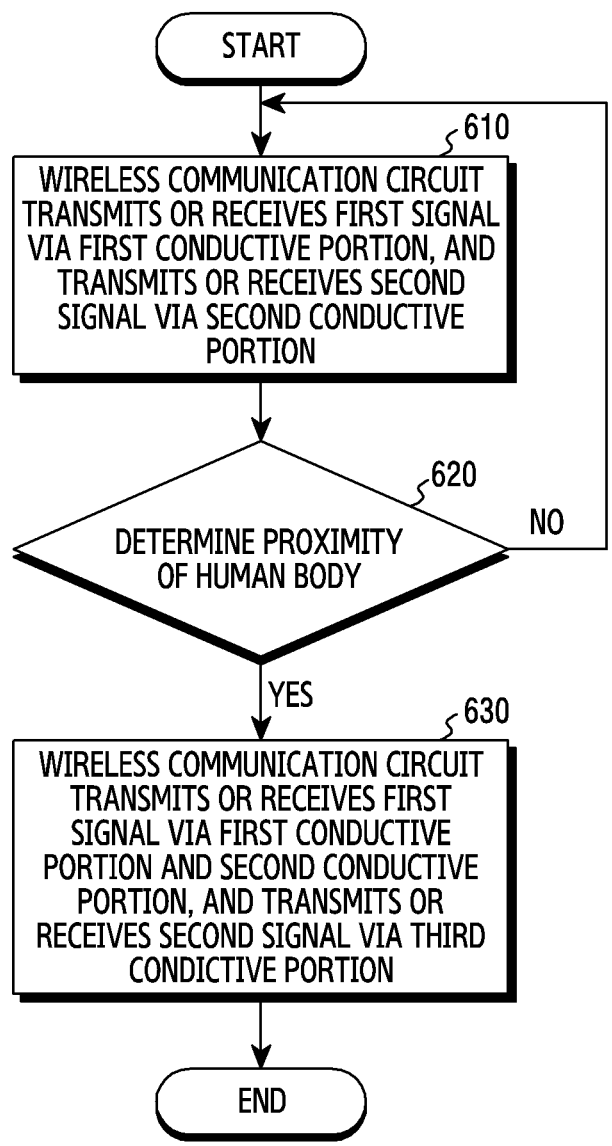
FIG. 6 is a flowchart for determining a connection relation between a wireless communication circuit and conductive portions according to an embodiment.

FIG. 6 is a flowchart for determining a connection relation between a wireless communication circuit and conductive portions according to an embodiment.

Referring to FIG. 6, the wireless communication circuit 430 may change the feeding structure for transmitting and receiving a signal of the first frequency band and a signal of the second frequency band, depending on proximity of a human body.

According to an embodiment, in operation 610, the wireless communication circuit 430 may be electrically connected to the first conductive portion, feed power to the first conductive portion, and may thus transmit or receive a first signal including the first frequency band via the first conductive portion, and may be electrically connected to the second conductive portion, feed power to the second conductive portion, and may thus transmit or receive a second signal including the second frequency band via the second conductive portion. For example, via the structure of FIG. 5A or FIG. 5B, the wireless communication circuit 430 may feed power to the first conductive portion to transmit/receive the first signal, and may feed power to the second conductive portion to transmit/receive the second signal.

According to an embodiment, in operation 620, a grip sensor may detect the proximity of a human body. In operation 620 according to an embodiment, in a case where a human body is not close according to the result of the grip sensor which has detected the proximity of a human body, operation 610 may be performed. According to another embodiment, in a case where the human body is close according to the result of the determination of operation 620, operation 630 may be performed.

In operation 630 according to an embodiment, the wireless communication circuit 430 may be electrically connected to the first conductive portion and the second conductive portion, feed power to the first conductive portion and the second conductive portion, and may thus transmit or receive a first signal including the first frequency band via the first conductive portion and the second conductive portion. For example, via the structure of FIG. 5D, the wireless communication circuit 430 may feed power to the first conductive portion and the second conductive portion, and may thus transmit or receive the first signal including the first frequency band via the first conductive portion and the second conductive portion.

In operation 630 according to an embodiment, the wireless communication circuit 430 may be electrically connected to the third conductive portion, feed power to the third conductive portion, and may thus transmit or receive a second signal including the second frequency band. For example, via the structure of FIG. 5D, FIG. 5B, FIG. 5C, and FIG. 5E, the wireless communication circuit 430 may feed power to the third conductive portion, and may thus transmit or receive the second signal including the second frequency band.

Figure 7:
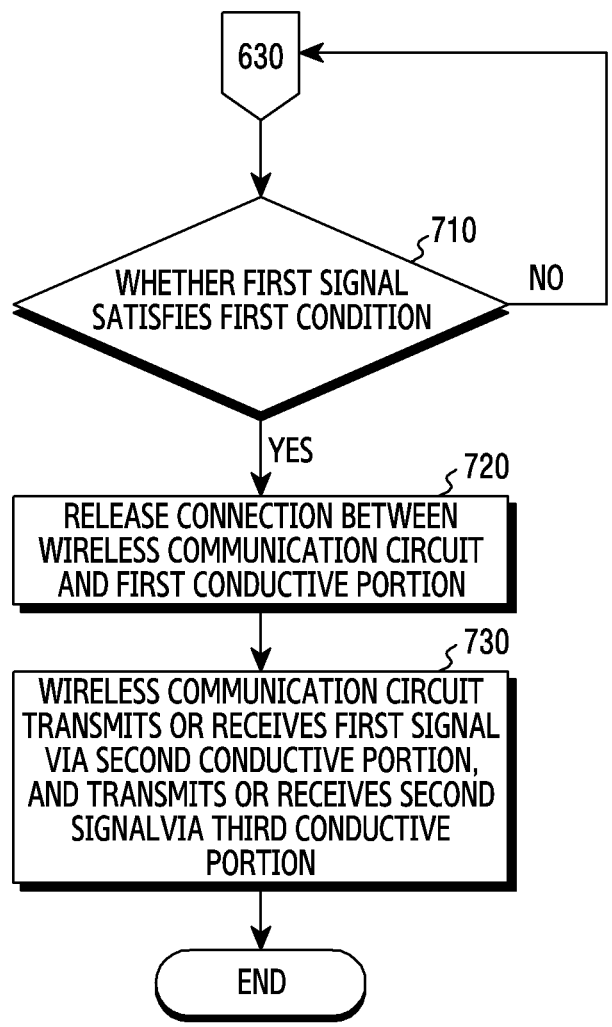
FIG. 7 is a flowchart for changing a connection relation between a wireless communication circuit and conductive portions according to an embodiment.

FIG. 7 is a flowchart for changing a connection relation between a wireless communication circuit and conductive portions according to an embodiment. The descriptions overlapping those of FIG. 6 will be omitted.

Referring to both FIG. 6 and FIG. 7, an electronic device according to an embodiment may change electrical connection paths between the wireless communication circuit and the plurality of conductive portions depending on whether a specific condition is satisfied.

In operation 710 according to an embodiment, an electronic device may determine whether a first condition is satisfied, while performing operation 630. The first condition according to an embodiment may be a condition in which radiation performance (e.g., radiation intensity, coverage, or resonance degree) of the first signal is below a predetermined level, but is not limited thereto. The first condition according to another embodiment may be whether or not a user inputs. An electronic device according to an embodiment may provide a guide for the above-described input of the user. According to an embodiment, in a case where the first signal does not satisfy the first condition, the electronic device may perform operation 630. According to another embodiment, in a case where the first signal satisfies the first condition, the electronic device may perform operation 720.

In operation 720 according to an embodiment, the electronic device may release the connection between the wireless communication circuit and the first conductive portion. Referring to both FIGS. 5A-5E and FIG. 7, in operation 720, the connection between the wireless communication circuit 430 and the conductive portions may be switched, by the first switching circuit 441, from one mode among the first mode, the second mode, or the third mode to the fifth mode. According to another embodiment, in operation 720, the connection between the wireless communication circuit 430 and the conductive portions may be switched, by the first switching circuit 441, from one mode among the first mode, the second mode, or the third mode to the fourth mode, and then may be switched to the fifth mode.

In operation 730 according to an embodiment, the wireless communication circuit 430 may be electrically connected to the second conductive portion, feed power to the second conductive portion, and may thus transmit or receive the first signal including the first frequency band via the second conductive portion. In operation 730 according to an embodiment, the wireless communication circuit 430 may be electrically connected to the third conductive portion, feed power to the third conductive portion, and may thus transmit or receive the second signal including the second frequency band via the third conductive portion. Referring to both FIGS. 5A-5E and FIG. 7, in operation 730, the connection between the wireless communication circuit 430 and the conductive portions may be switched, by the second switching circuit 442, from the first mode to one mode among the third mode, the fourth mode, or the fifth mode. For example, in operation 730, the connection between the wireless communication circuit 430 and the conductive portions may be switched, by the second switching circuit 442, from the first mode to the second mode, and then may be switched to one mode among the third mode, the fourth mode, or the fifth mode.

Figure 8A:
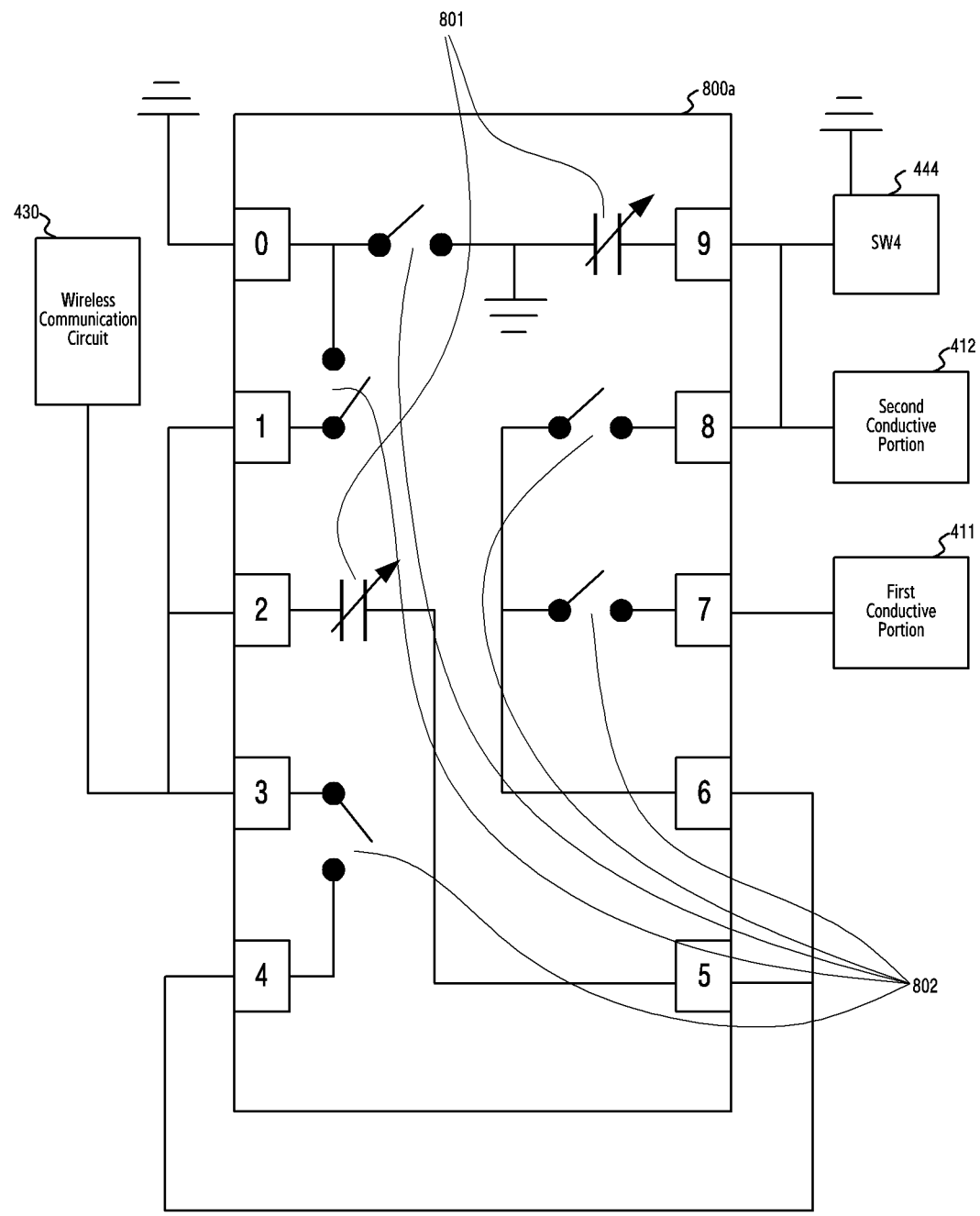
FIG. 8A illustrates a switching circuit including internal elements according to an embodiment.
Figure 8B:
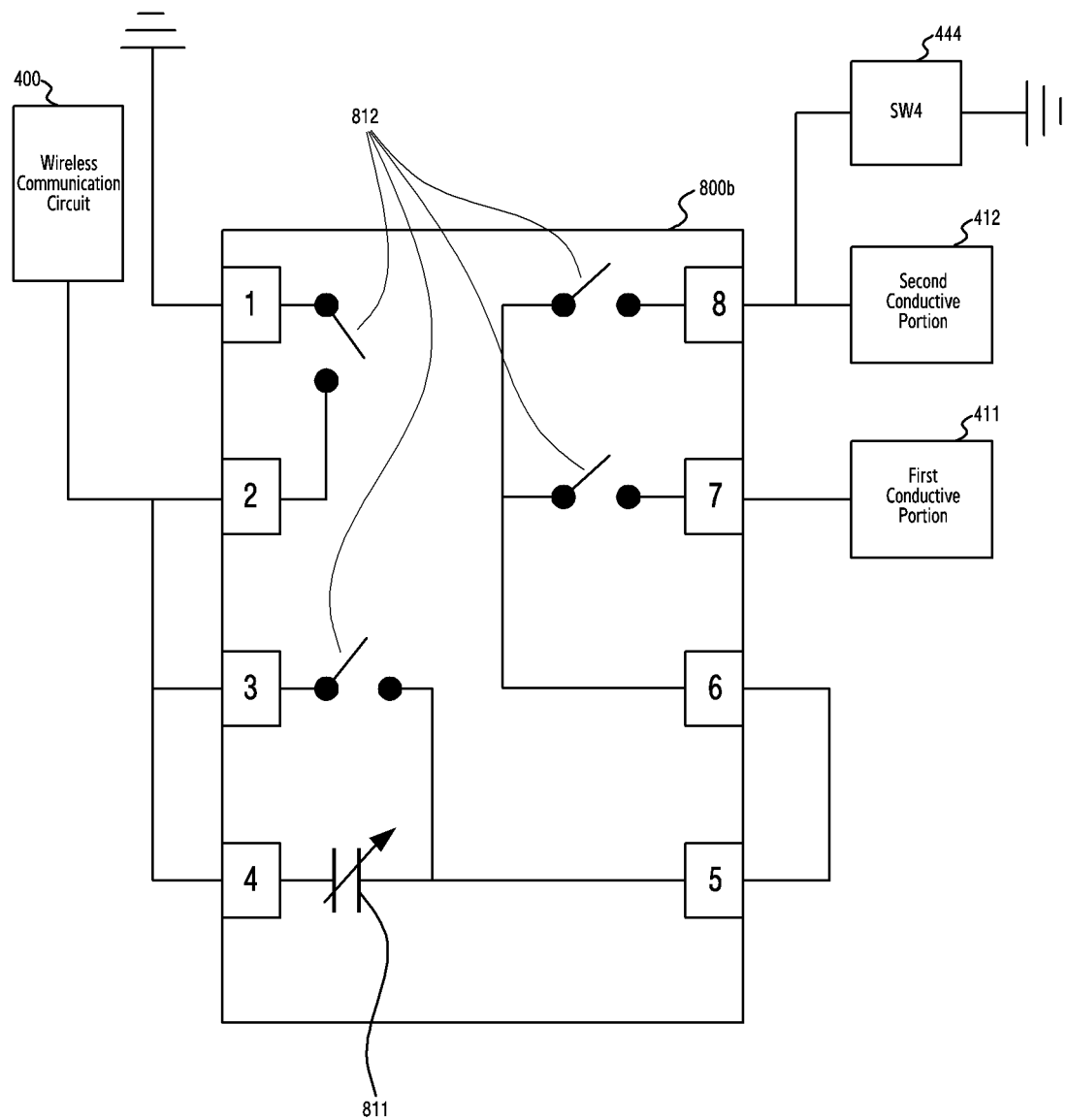
FIG. 8B illustrates a switching circuit including internal elements according to another embodiment.
Figure 8C:
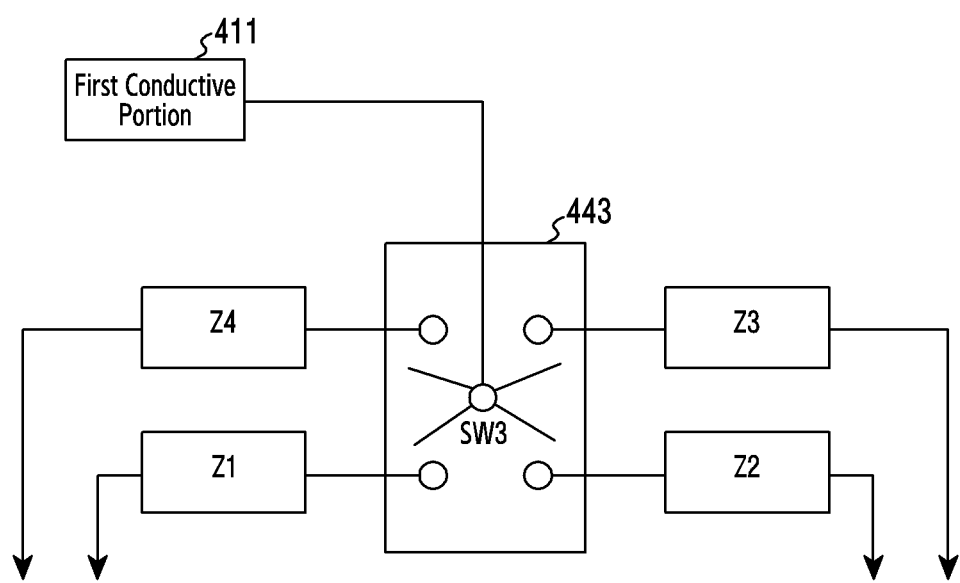
FIG. 8C illustrates a third switching circuit connected to a first conductive portion according to an embodiment.
Figure 8D:
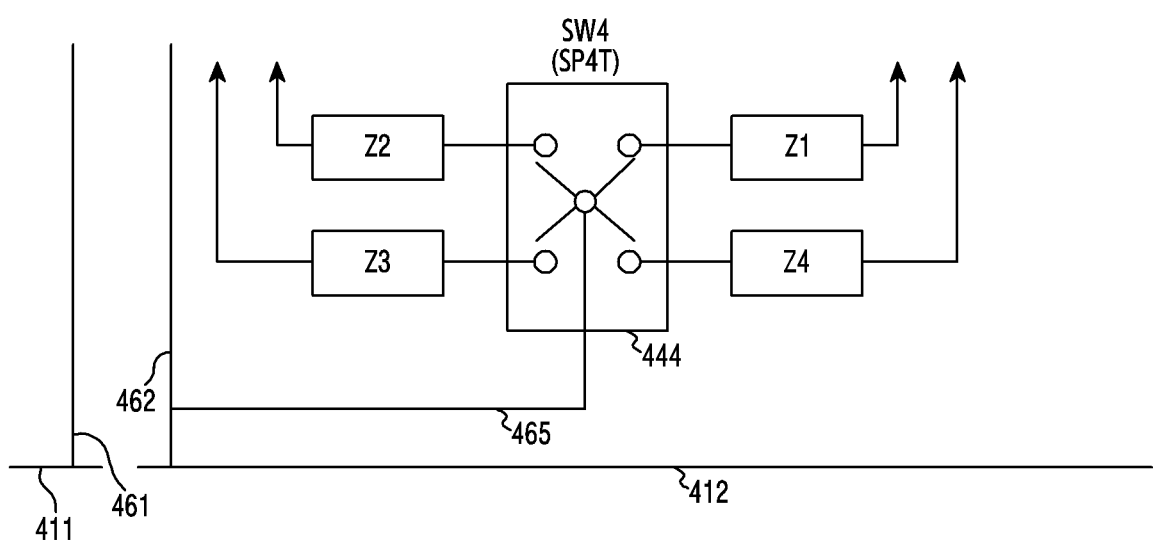
FIG. 8D illustrates a fourth switching circuit connected to a second conductive portion according to an embodiment.

FIG. 8A illustrates a switching circuit including internal elements according to an embodiment. FIG. 8B illustrates a switching circuit including internal elements according to another embodiment. FIG. 8C illustrates a third switching circuit connected to a first conductive portion according to an embodiment. FIG. 8D illustrates a fourth switching circuit connected to a second conductive portion according to an embodiment.

Referring to both FIG. 8A and FIG. 8B, a switching circuit 800a or 800b according to an embodiment may include a plurality of internal elements 801 or 811 and switches 802 or 812.

Referring to FIGS. 5A-5E, FIG. 8A, and FIG. 8B together, the switching circuit (e.g., the first switching circuit 441 of FIGS. 5A-5E) according to an embodiment may be a tuner including the plurality of internal elements 801 or 811 and the plurality of internal switches 802 or 812, but is not limited thereto. The switching circuit 800a or 800b according to an embodiment may be electrically connected to a plurality of conductive portions 411 or 412. According to an embodiment, the switching circuit 800a or 800b may be electrically connected to the fourth switching circuit 444. According to an embodiment, the fourth switching circuit 444 may be connected to a ground.

According to an embodiment, in a case where a grip sensor has detected proximity of a human body, the switching circuit 800a or 800b may control the internal switches 802 or 812 to allow the wireless communication circuit 430 to be electrically connected to the first conductive portion 411 and/or the second conductive portion 412. According to an embodiment, in a case where the grip sensor has detected proximity of a human body, the switching circuit 800a or 800b may control the internal elements 801 or 811 to have an impedance which is electrically close to a short circuit. The switching circuit 800a or 800b according to an embodiment may have an impedance which is electrically close to a short circuit, and may thus change electrical paths connected to the first conductive portion 411 via the switching circuit 800a or 800b from the wireless communication circuit 430. According to an embodiment, by changing electrical paths connected to the first conductive portion 411 from the wireless communication circuit 430, the wireless communication circuit 430 may adjust the frequency band of the first signal transmitted or received via the first conductive portion 411.

According to another embodiment, in a case where a proximity sensor does not detect the proximity of a human body, the switching circuit 800a or 800b may control the internal switches 802 or 812 to allow the wireless communication circuit 430 to be electrically connected to the first conductive portion 411. The switching circuit 800a or 800b according to an embodiment may control the internal switches 802 or 812 to allow the wireless communication circuit 430 to be electrically connected to the second conductive portion 412. The switching circuit 800a or 800b according to an embodiment may control the internal elements 801 or 811 to change the length of the electrical path connected to the first conductive portion 411 from the wireless communication circuit 430. The switching circuit 800 according to an embodiment may control the internal elements 801 or 811 to change the length of the electrical path connected to the second conductive portion 412 from the wireless communication circuit 430. According to an embodiment, by changing the electrical path connected to the second conductive portion 412 from the wireless communication circuit 430, the wireless communication circuit 430 may adjust the frequency band of the first signal transmitted or received via the second conductive portion 412.

Referring to both FIG. 8C and FIG. 8D, the third switching circuit 443 and/or the fourth switching circuit 444 may include a single pole 4 throw (SP4T) switch. According to an embodiment, the third switching circuit 443 and/or the fourth switching circuit 444 may include a single pole double throw (SPDT) switch, but is not limited thereto.

The third switching circuit 443 and/or the fourth switching circuit 444 according to an embodiment may be electrically connected to a plurality of impedances Z1, Z2, Z3, and Z4. For example, at least one among the plurality of impedances Z1, Z2, Z3, and Z4 may be 100 pF, but is not limited thereto. According to an embodiment, the third switching circuit 443 and the fourth switching circuit 444 may control an internal path or the plurality of impedances Z1, Z2, Z3, and Z4, and may thus change the feeding structure of the conductive portions 410 and the wireless communication circuit 430.

The third switching circuit 443 according to an embodiment may be electrically connected to the first conductive portion 411. The fourth switching circuit 444 according to an embodiment may be electrically connected to the second feeding line 462 via the fifth feeding line 465. According to an embodiment, the fourth switching circuit 444 may be electrically connected to the second conductive portion 412 via the fifth feeding line 465 and the second feeding line 462.

Figure 9A:
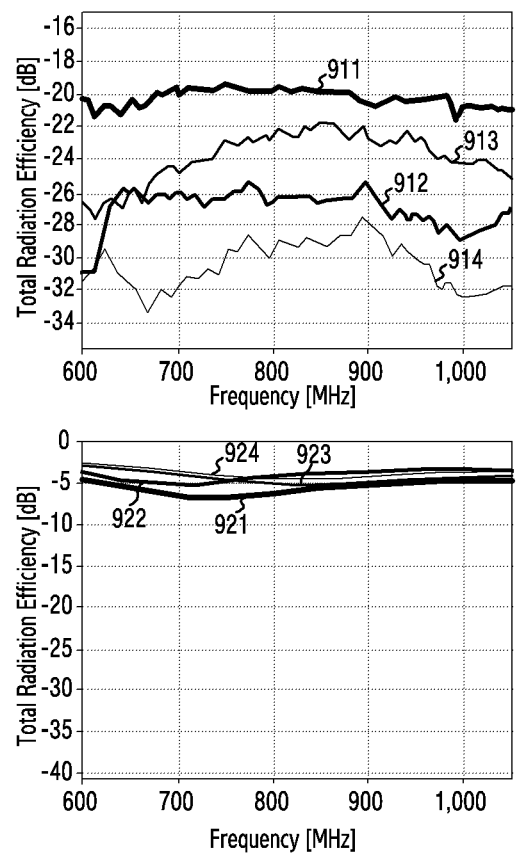
FIG. 9A illustrates results of signal radiation via a wireless communication circuit of an electronic device according to an embodiment.
Figure 9B:
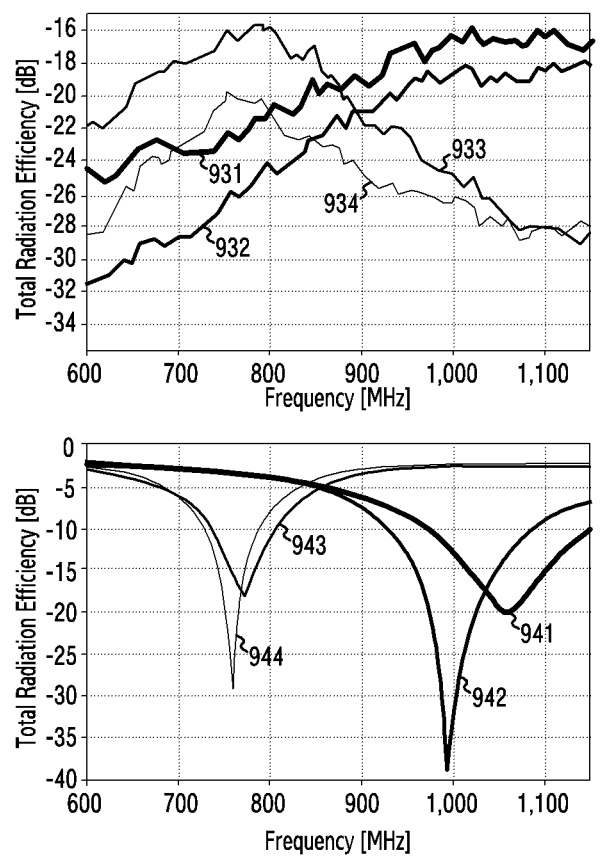
FIG. 9B illustrates results of signal radiation via a wireless communication circuit of an electronic device according to another embodiment.
Figure 9C:
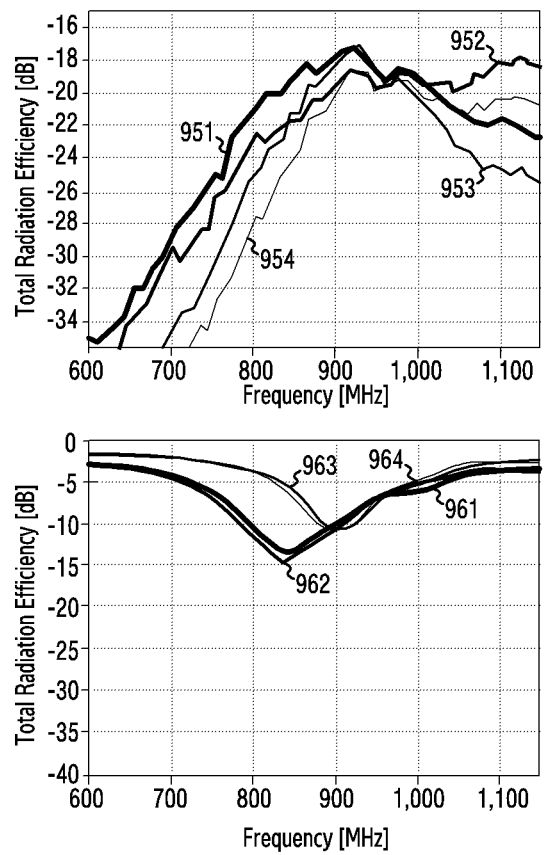
FIG. 9C illustrates results of signal radiation via a wireless communication circuit of an electronic device according to another embodiment.

FIG. 9A illustrates results of a signal radiation via a wireless communication circuit of an electronic device according to an embodiment. FIG. 9B illustrates results of a signal radiation via a wireless communication circuit of an electronic device according to another embodiment. FIG. 9C illustrates results of a signal radiation via a wireless communication circuit of an electronic device according to another embodiment.

Referring to FIG. 4, FIGS. 5A-5E, FIG. 9A, FIG. 9B, and FIG. 9C together, the performance (e.g., resonance degree or radiation intensity of a signal) of an antenna structure 400 may be improved by changing an electrical connection path between the wireless communication circuit 430 and the plurality of conductive portions 410 of the electronic device 100 according to an embodiment.

Referring to FIGS. 5A-5E and FIG. 9A, in a case where a connection path between the wireless communication circuit 430 and the plurality of conductive portions 410 has a connection path of FIG. 5A, FIG. 5B, or FIG. 5C, the results of a first right grip 911, a first left grip 912, a second right grip 913, and a second left grip 914 may be equal to or less than the target performance of the antenna structure 400 in radiation efficiency. According to an embodiment, in a case where the connection path between the wireless communication circuit 430 and the plurality of conductive portions 410 has the connection path of FIG. 5A, FIG. 5B, or FIG. 5C, the results of a first right grip 921, a first left grip 922, a second right grip 923, and a second left grip 924 may be equal to or less than the target performance of the antenna structure 400 in reflection coefficient.

Referring to FIGS. 5A-5E and FIG. 9B, in a case where the connection path between the wireless communication circuit 430 and the plurality of conductive portions 410 has a connection path of FIG. 5D, at least a part of the results of a first right grip 931, a first left grip 932, a second right grip 933, and a second left grip 934 may be greater than the target performance of the antenna structure 400 in radiation efficiency. According to an embodiment, in a case where the connection path between the wireless communication circuit 430 and the plurality of conductive portions 410 has a connection path of FIG. 5D, at least a part of the results of a first right grip 941, a first left grip 942, a second right grip 943, and a second left grip 944 may be greater than the target performance of the antenna structure 400 in reflection coefficient.

Referring to FIGS. 5A-5E and FIG. 9C, in a case where the connection path between the wireless communication circuit 430 and the plurality of conductive portions 410 has a connection path of FIG. 5D, at least a part of the results of a first right grip 951, a first left grip 952, a second right grip 953, and a second left grip 954 may be greater than the target performance of the antenna structure 400 in radiation performance. According to an embodiment, in a case where the connection path between the wireless communication circuit 430 and the plurality of conductive portions 410 has a connection path of FIG. 5D, at least a part of the results of a first right grip 961, a first left grip 962, a second right grip 963, and a second left grip 964 may be greater than the target performance of the antenna structure 400 in reflection coefficient.

Figure 10A:
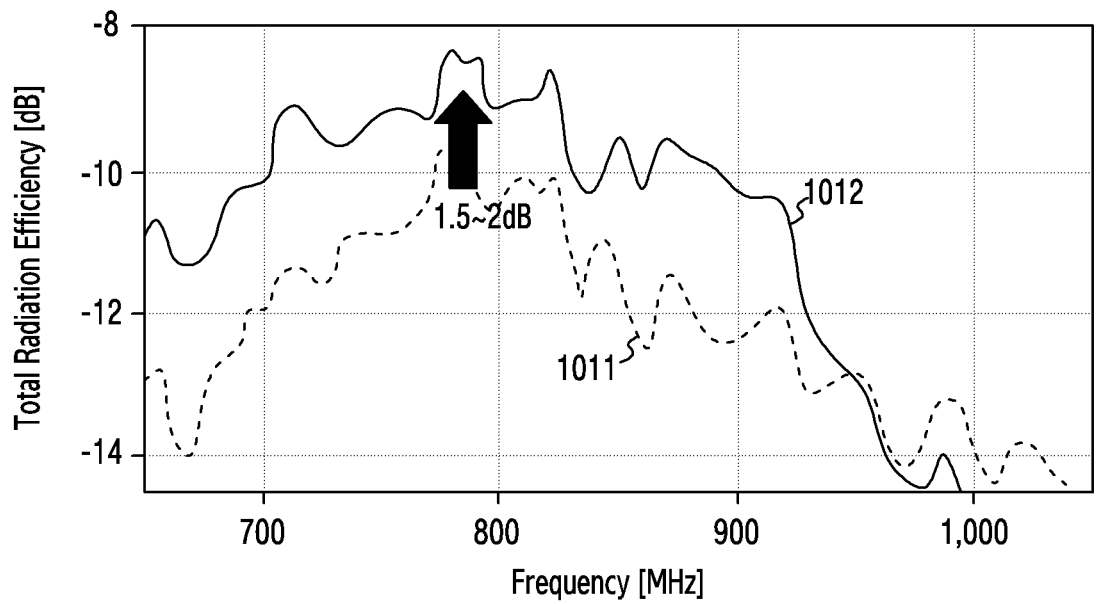
FIGS. 10A and 10B illustrate results of signal radiation via a wireless communication circuit of an electronic device according to another embodiment.
Figure 10B:
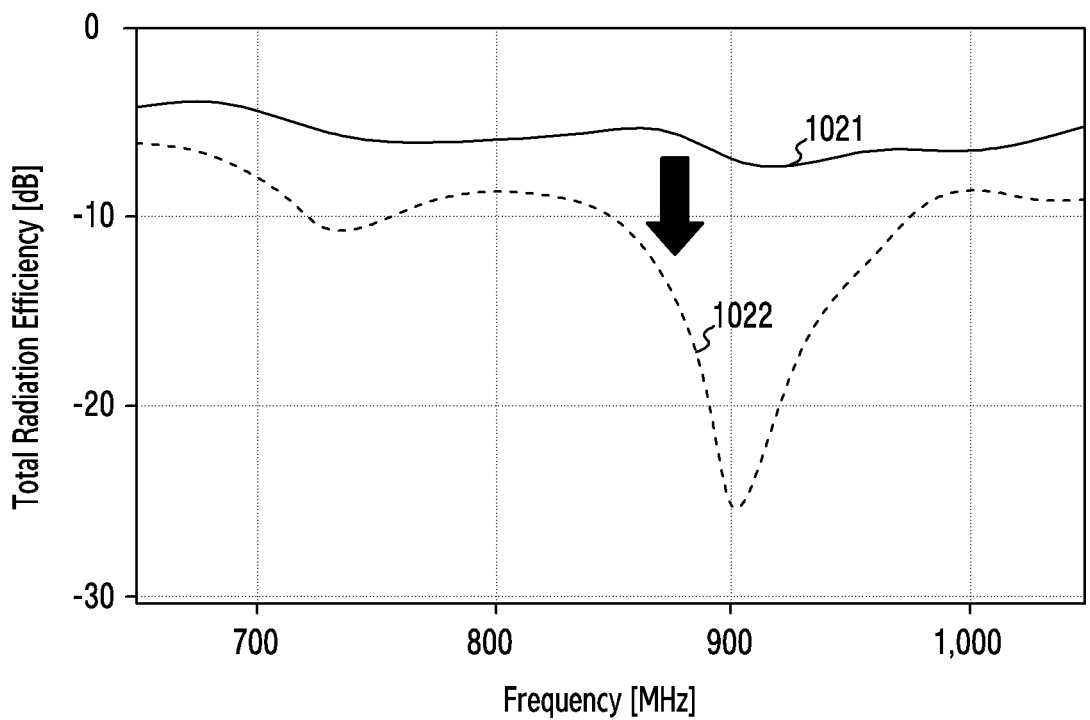

FIG. 10 illustrates results of signal radiation via a wireless communication circuit of an electronic device according to another embodiment.

Referring to FIG. 4, FIGS. 5A-5E, and FIG. 10 together, the performance (e.g., resonance degree or radiation intensity of a signal) of an antenna structure 400 may be improved by changing the electrical connection path between the wireless communication circuit 430 and the plurality of conductive portions 410 of the electronic device 100 according to an embodiment.

Referring to FIGS. 5A-5E and FIG. 10A, in a case where the connection path between the wireless communication circuit 430 and the plurality of conductive portions 410 is changed from the connection path of FIG. 5A to a connection path of FIG. 5E, the radiation efficiency may be improved by about 1.5 dB to about 2.0 dB from a first radiation 1011 to a second radiation 1012, but is not limited to these values.

Referring to FIGS. 5A-5E and FIG. 10B, in a case where the connection path between the wireless communication circuit 430 and the plurality of conductive portions 410 is changed from the connection path of FIG. 5A to the connection path of FIG. 5E, the radiation coefficient may be improved from a first reflection coefficient 1021 to a second reflection coefficient.

Figure 11:
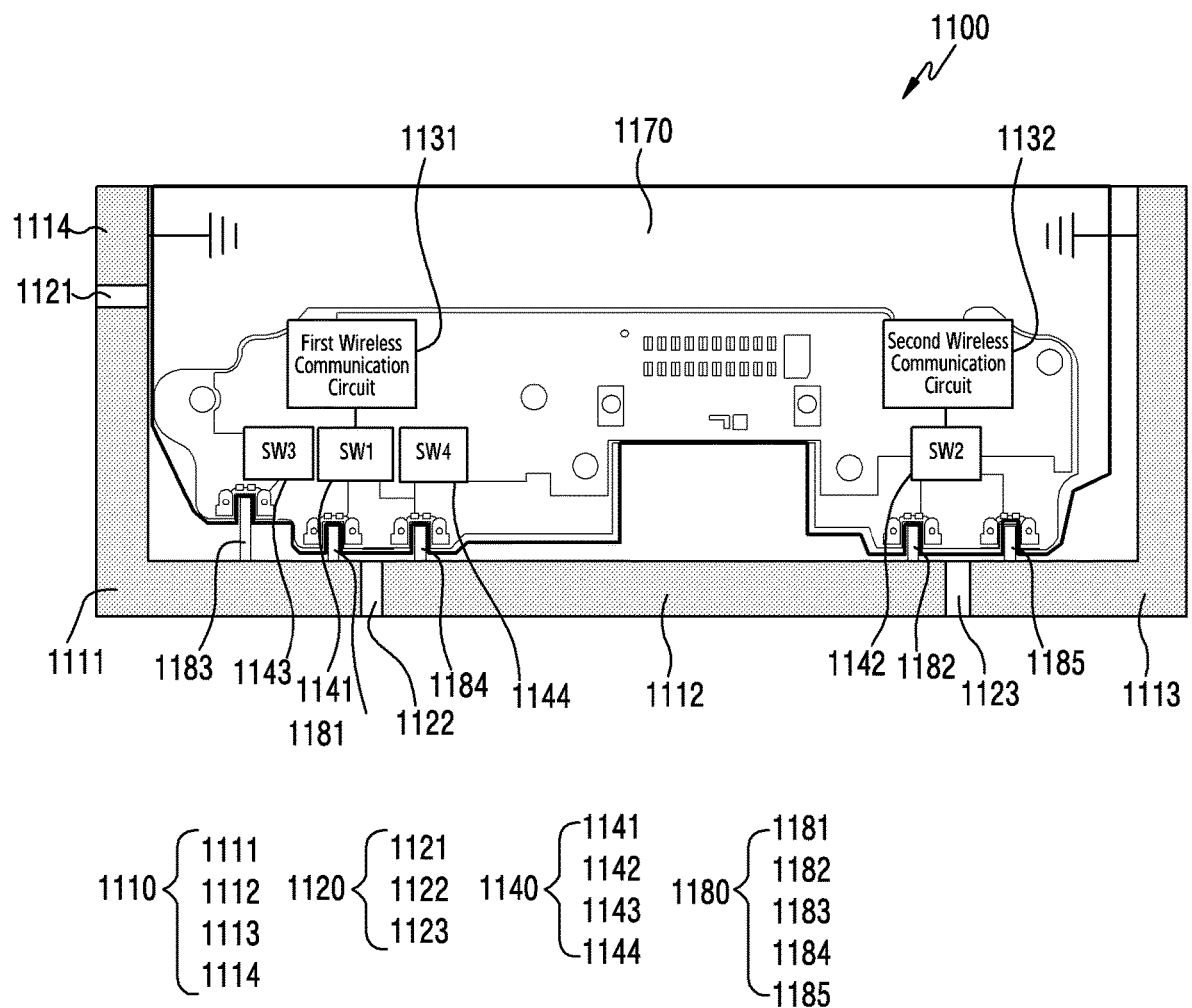
FIG. 11 illustrates an electronic device including a first wireless communication circuit and a second wireless communication circuit according to an embodiment.

FIG. 11 illustrates an electronic device including a first wireless communication circuit and a second wireless communication circuit according to an embodiment.

Referring to FIG. 11, an antenna structure 1100 according to an embodiment may include a first wireless communication circuit 1131, a second wireless communication circuit 1132, a plurality of switching circuits 1140, a plurality of conductive portions 1110, a printed circuit board (PCB) 1170 including a ground layer, and a plurality of insulating portions 1120. The same/similar reference numerals have been used for the same or substantially the same components as those described above, and the overlapping descriptions will be omitted.

Referring to FIG. 11, the first wireless communication circuit 1131 may be electrically connected to the first switching circuit 1141. The first wireless communication circuit 1131 according to an embodiment may be electrically connected to a first conductive portion 1111 and/or a second conductive portion 1112 via the first switching circuit 1141. The first wireless communication circuit 1131 according to an embodiment may feed power to the first conductive portion 1111 and/or the second conductive portion 1112, and may thus transmit or receive a first signal including the first frequency band.

The second wireless communication circuit 1132 according to an embodiment may be electrically connected to a second switching circuit 1142. The second wireless communication circuit 1132 according to an embodiment may be electrically connected to the second conductive portion 1112 and/or a third conductive portion 1113 via the second switching circuit 1142. The second wireless communication circuit 1132 according to an embodiment may feed power to the second conductive portion 1112 and/or the third conductive portion 1113, and may thus transmit or receive a second signal including the second frequency band.

A third switching circuit 1143 according to an embodiment may be electrically connected to the first conductive portion 1111. The third switching circuit 1143 according to an embodiment may include internal elements, control the internal elements, and may thus change the electrical path related to the first conductive portion 1111. For example, the internal variable capacitor of the third switching circuit 1143 may be adjusted to configure the impedance of the third switching circuit 1143 to be very small, and thus an electrical path leading from the first wireless communication circuit 1131 via the first switching circuit 1141 to a point on the first conductive portion 1111 connected to the third switching circuit 1143 may be configured.

A fourth switching circuit 1144 according to an embodiment may be electrically connected to the second conductive portion 1112. The fourth switching circuit 1144 according to an embodiment may include internal elements, control the internal elements, and may thus change the electrical path related to the second conductive portion 1112. For example, the internal variable capacitor of the fourth switching circuit 1144 may be adjusted, and thus the length of an electrical path connected from the first wireless communication circuit 1131 via the first switching circuit 1141 to the second conductive portion 1112 may be changed.

The second switching circuit 1142 according to an embodiment may include internal elements. The second switching circuit 1142 according to an embodiment may control the internal elements, and may thus change the length of an electrical path extending from the second wireless communication circuit 1132 via the second switching circuit 1142 to the second conductive portion 1112 and/or the third conductive portion 1113.

An electronic device 1100 according to an embodiment may include a plurality of connection portions 1180. The plurality of connection portions 1180 according to an embodiment may be a part of the plurality of conductive portions 1110. A plurality of connection portions 1180 according to another embodiment may include a connection structure (e.g., a C-clip, a pogo pin, and a screw) disposed on a printed circuit board 1170, but are not limited thereto. For example, the first conductive portion 1111 may be electrically connected to the third switching circuit 1143 via a third connection portion 1183. The second conductive portion 1112 may be electrically connected to the fourth switching circuit 1144 via a fourth connection portion 1184, and may be electrically connected to the second switching circuit 1142 via a second connection portion 1182.

According to an embodiment, the third conductive portion 1113 and/or a fourth conductive portion 1114 may be connected to a ground layer included in the printed circuit board 1170.

Figure 12:
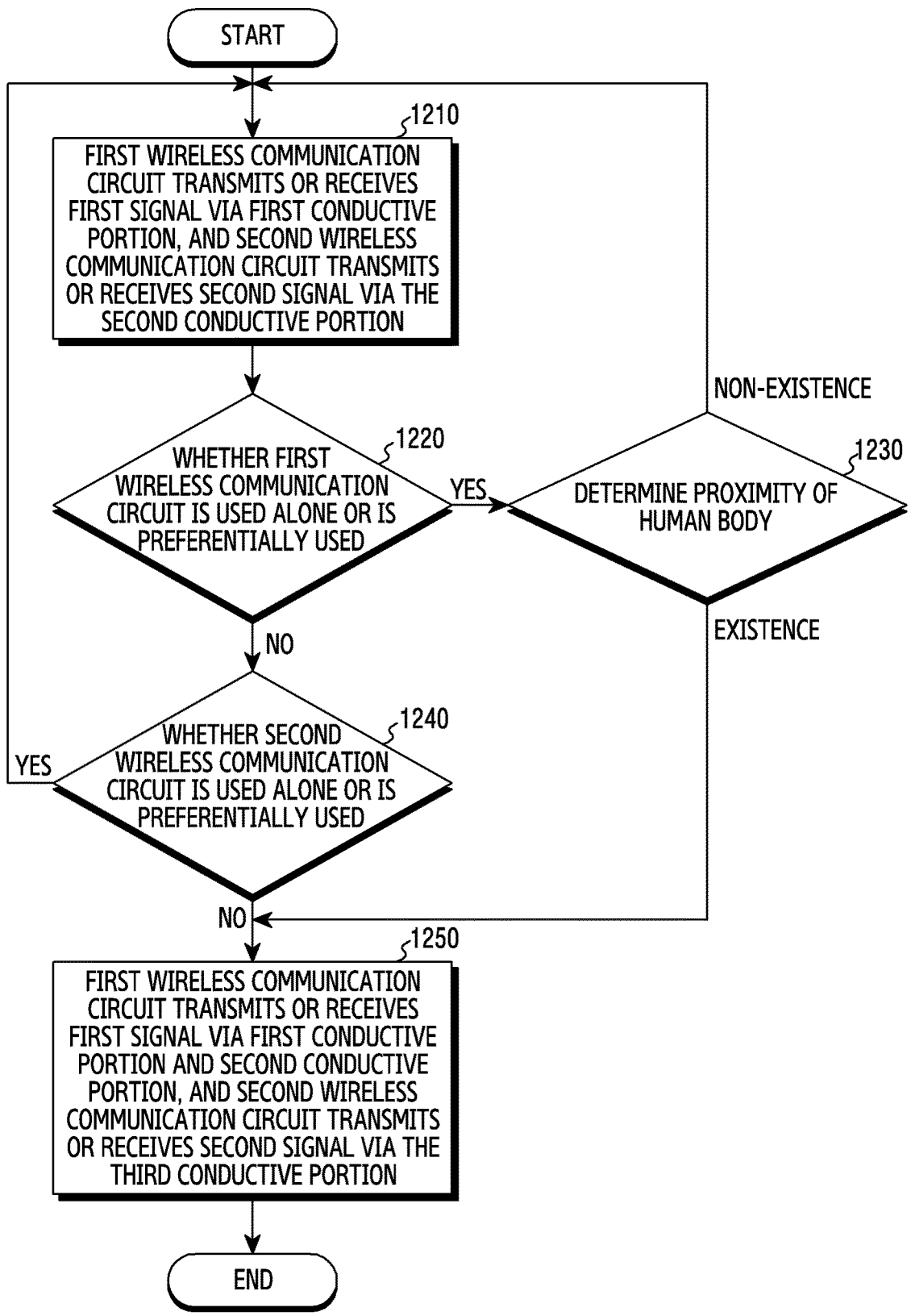
FIG. 12 is a flowchart for determining a connection relation between wireless communication circuits and conductive portions according to an embodiment.

FIG. 12 is a flowchart for determining a connection relation between wireless communication circuits and conductive portions according to an embodiment.

Referring to FIG. 11 and FIG. 12 together, in operation 1210, the first wireless communication circuit 1131 according to an embodiment may feed power to the first conductive portion 1111 and may thus transmit or receive a first signal including the first frequency band via the first conductive portion 1111. The second wireless communication circuit 1132 according to an embodiment may feed power to the second conductive portion 1112 in operation 1210, and may thus transmit or receive a second signal including the second frequency band via the second conductive portion 1112.

An electronic device according to an embodiment may include a processor. A processor according to an embodiment may determine whether the first wireless communication circuit 1131 is used alone or the first wireless communication circuit 1131 among the first wireless communication circuit 1131 and the second wireless communication circuit 1132 is preferentially used to transmit or receive a signal in operation 1220. According to the result of determination, in a case where the first wireless communication circuit 1131 is used alone or the first wireless communication circuit 1131 among the first wireless communication circuit 1131 and the second wireless communication circuit 1132 is preferentially used, a processor according to an embodiment may detect and determine proximity of a human body by using a grip sensor in operation 1230. The member configured to detect the proximity of a human body is not limited to a grip sensor.

In a case where the grip sensor does not detect the proximity of a human body, the antenna structure 1100 according to an embodiment may perform operation 1210. According to another embodiment, in a case where the grip sensor detects the proximity of a human body, in operation 1250, the first wireless communication circuit 1131 may be electrically connected to the first conductive portion 1111 and the second conductive portion 1112, feed power to the first conductive portion 1111 and the second conductive portion 1112, and may thus transmit or receive a first signal including the first frequency band via the first conductive portion 1111 and the second conductive portion 1112. In an embodiment, in a case where the grip sensor detects the proximity of a human body, in operation 1250, the second wireless communication circuit 1131 may be electrically connected to the third conductive portion 1113, feed power to the third conductive portion 1113, and may thus transmit or receive a second signal including the second frequency band via the third conductive portion 1113.

A processor according to an embodiment may determine whether the second wireless communication circuit 1132 is used alone or the second wireless communication circuit 1132 is preferentially used to transmit or receive a signal in operation 1240. According to the result of determination, in a case where the second wireless communication circuit 1132 is used alone or the second wireless communication circuit 1132 among the first wireless communication circuit 1131 and the second wireless communication circuit 1132 is preferentially used to transmit or receive a signal, operation 1210 may be performed. In another embodiment, in a case where the second wireless communication circuit 1132 is not used alone and the second wireless communication circuit 1132 among the first wireless communication circuit 1131 and the second wireless communication circuit 1132 is not preferentially used to transmit or receive a signal, operation 1250 may be performed.

According to an embodiment, in operation 1250, the first wireless communication circuit 1131 may feed power to the first conductive portion 1111 and the second conductive portion 1112, and may thus transmit or receive a first signal including the first frequency band via the first conductive portion 1111 and the second conductive portion 1112. In operation 1250, the second wireless communication circuit 1132 according to an embodiment may feed power to the third conductive portion 1113, and may thus transmit or receive a second signal including the second frequency band via the third conductive portion 1113.

Figure 13A:
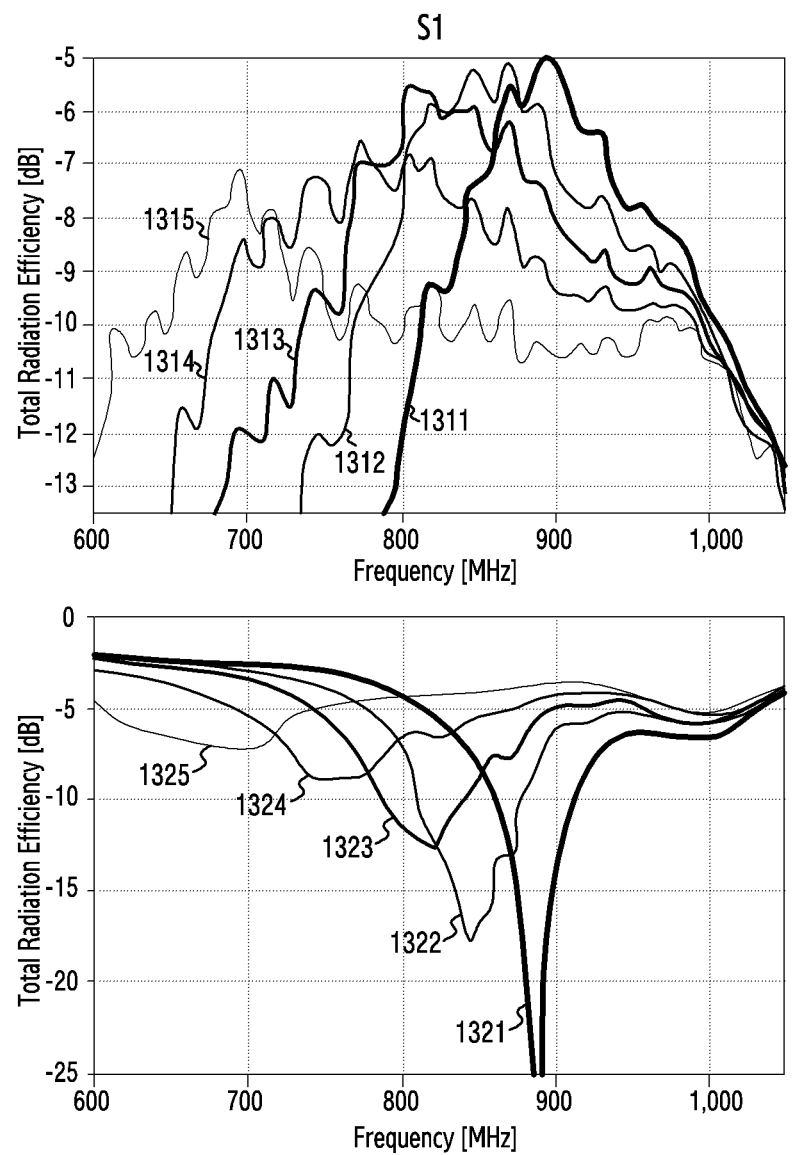
FIG. 13A illustrates results of signal radiation via a first wireless communication circuit in a first state in which the proximity of a human body is not detected according to an embodiment.
Figure 13B:
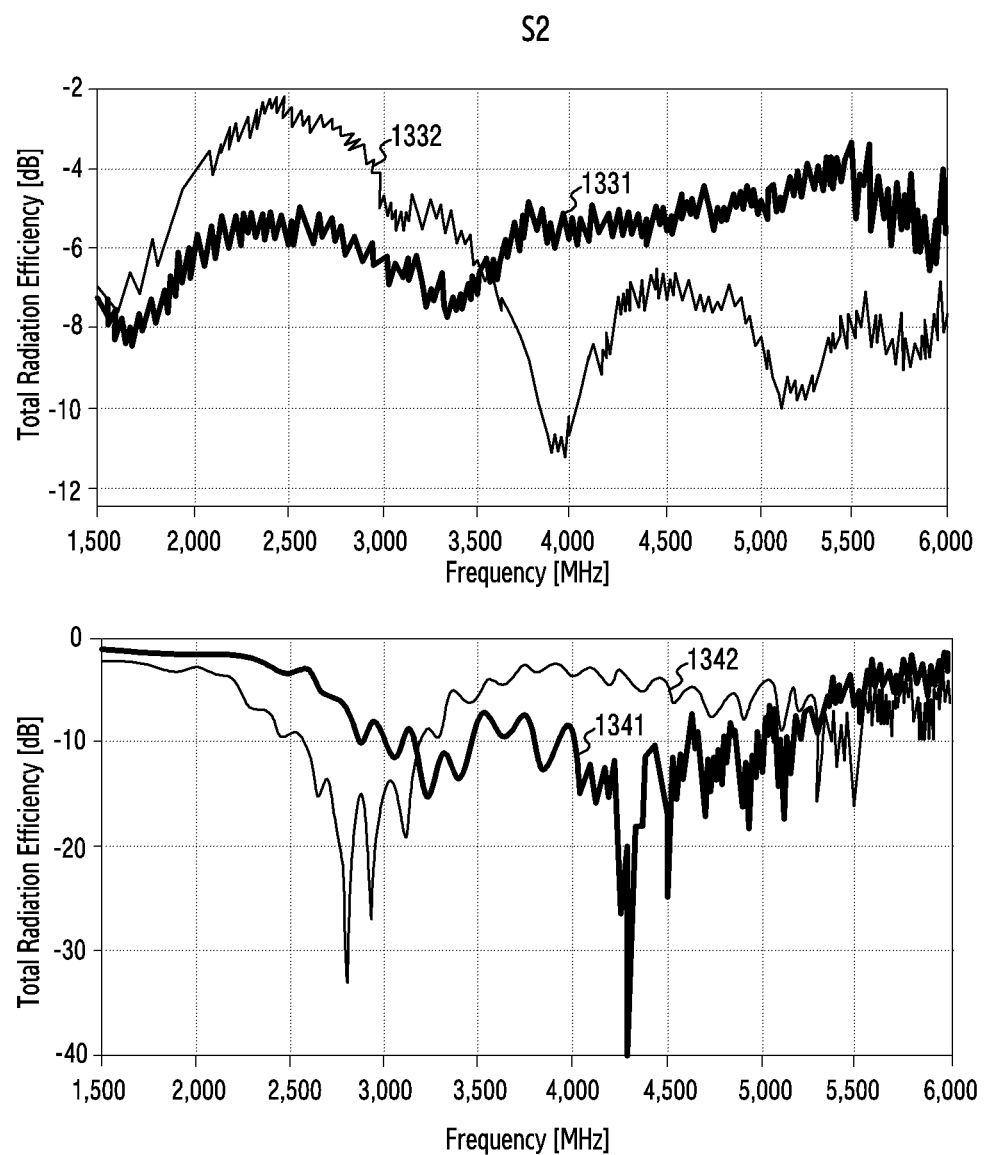
FIG. 13B illustrates results of signal radiation via a second wireless communication circuit in a first state in which the proximity of a human body is not detected according to an embodiment.

FIG. 13A illustrates results of signal radiation via a first wireless communication circuit in a first state in which the proximity of a human body is not detected according to an embodiment. FIG. 13B illustrates results of signal radiation via a second wireless communication circuit in a first state in which the proximity of a human body is not detected according to an embodiment.

Referring to FIG. 11 and FIG. 13A together, in a case where proximity of a human body is not detected according to an embodiment, radiation efficiency and reflection coefficient of a first signal via the first wireless communication circuit 1131 are shown. The first wireless communication circuit 1131 according to an embodiment may secure constant radiation efficiency and reflection coefficient for normal operation of the antenna structure 1100 in a frequency range of about 850 MHz to about 950 MHz.

According to an embodiment, according to the state of the plurality of switching circuits 1140, electrical paths connected from the first wireless communication circuit 1131 to the plurality of conductive portions 1110 may be changed.

According to an embodiment, the first wireless communication circuit 1131 may secure a plurality of radiation efficiencies 1311 to 1315 according to the state of the third switching circuit 1143 or the fourth switching circuit 1144. For example, the third switching circuit 1143 may obtain a first radiation efficiency 1311 by configuring a low impedance. According to an embodiment, the first wireless communication circuit 1131 may secure a plurality of reflection coefficients 1321 to 1325 according to the state of the third switching circuit 1143 or the fourth switching circuit 1144. For example, the third switching circuit 1311 may obtain a fifth reflection coefficient 1325 by configuring a high impedance.

Referring to FIG. 11 and FIG. 13B together, in a case where proximity of a human body is not detected according to an embodiment, radiation efficiency and reflection coefficient of a second signal via the second wireless communication circuit 1132 are shown.

According to an embodiment, according to the state of the plurality of switching circuits 1140, electrical paths connected from the second wireless communication circuit 1132 to the plurality of conductive portions 1110 may be changed.

According to an embodiment, the second wireless communication circuit 1132 may secure a plurality of radiation efficiencies 1331 and 1332 according to the state of the first switching circuit 1141 and the second switching circuit 1142. For example, the first switching circuit 1141 may obtain a first radiation efficiency 1331 in a case of being connected to the first conductive portion 1111. According to another example, in a case where the first switching circuit 1141 is connected to the second conductive portion 1112, a second radiation efficiency 1332 may be obtained. According to an embodiment, the second wireless communication circuit 1132 may secure a plurality of reflection coefficients 1341 and 1342 according to the state of the first switching circuit 1141 and the second switching circuit 1142. For example, in a case where the first switching circuit 1141 is connected to the first conductive portion 1111, a first reflection coefficient 1341 may be obtained. According to another example, in a case where the first switching circuit 1141 is connected to the second conductive portion 1112, a second reflection coefficient 1342 may be obtained.

Figure 14A:
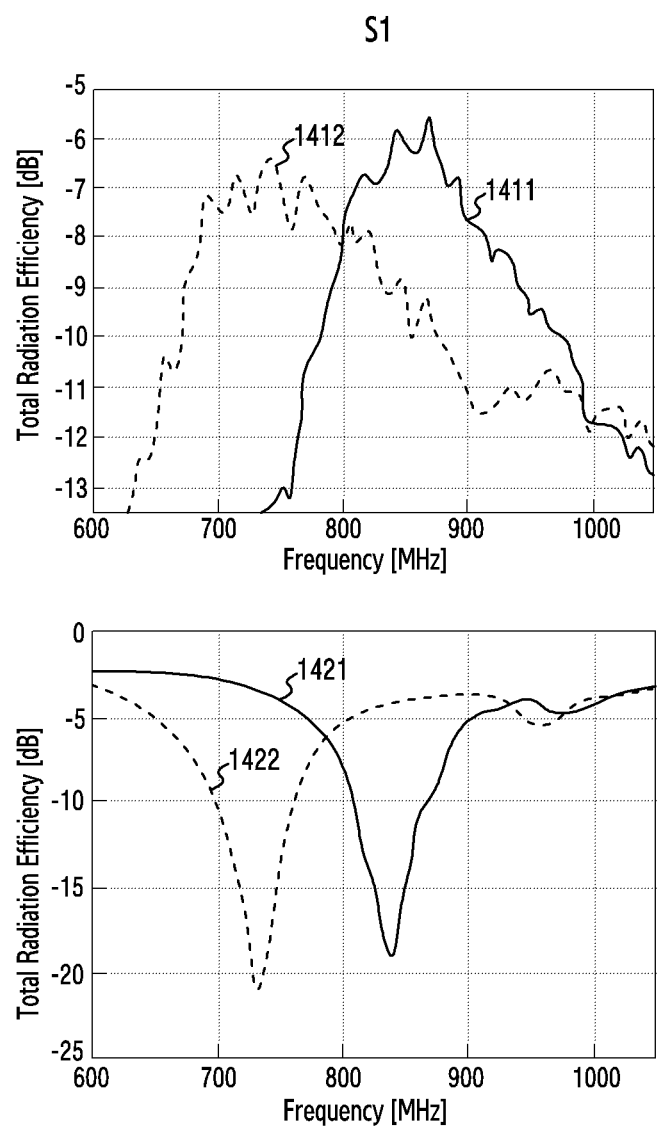
FIG. 14A illustrates results of signal radiation via a first wireless communication circuit in a second state in which the proximity of a human body is detected according to an embodiment.
Figure 14B:
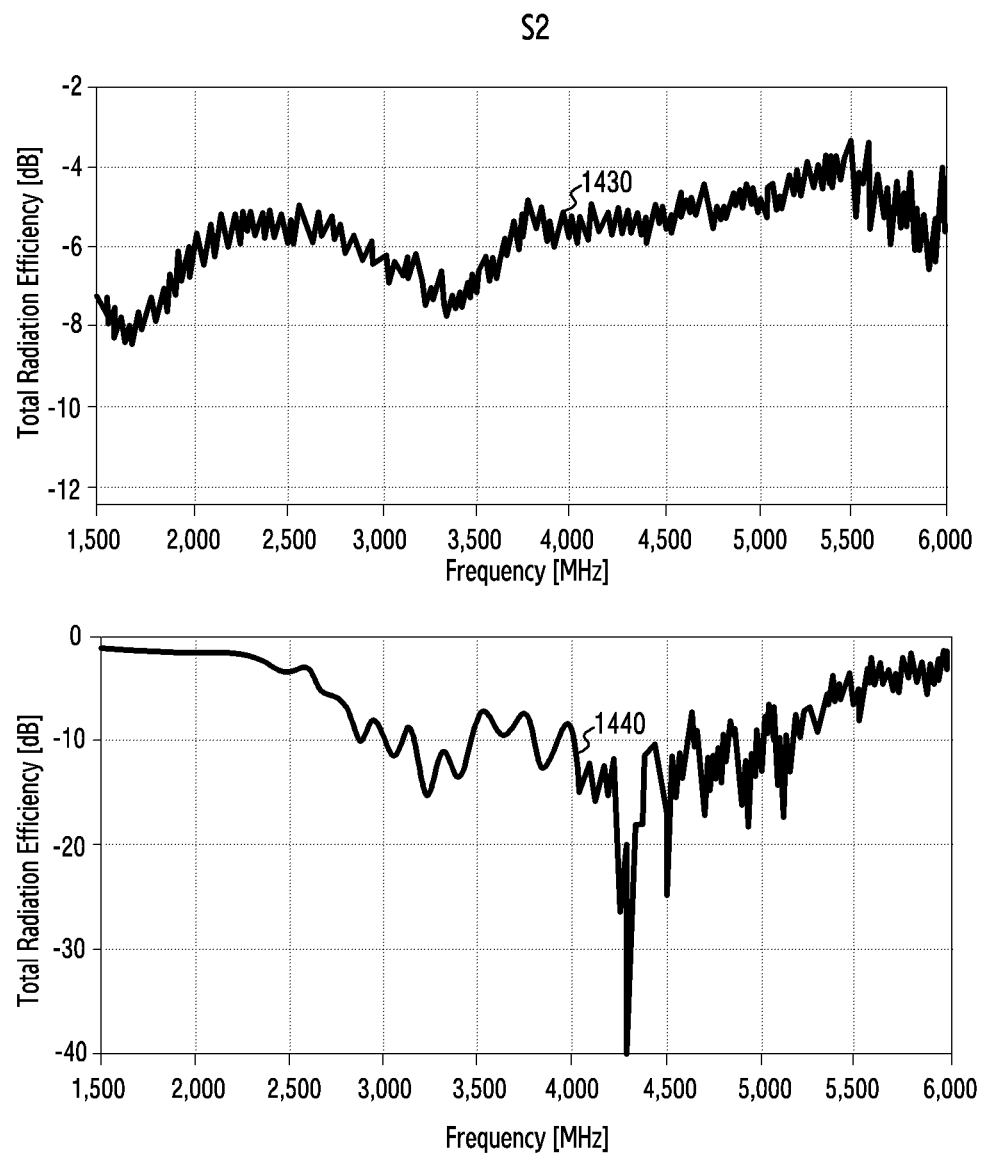
FIG. 14B illustrates results of signal radiation via a second wireless communication circuit in a second state in which the proximity of a human body is detected according to an embodiment.

FIG. 14A illustrates results of signal radiation via a first wireless communication circuit in a second state in which the proximity of a human body is detected according to an embodiment. FIG. 14B illustrates results of signal radiation via a second wireless communication circuit in a second state in which the proximity of a human body is detected according to an embodiment.

Referring to FIGS. 5A-5E, FIG. 11, and FIG. 14A, in a case where proximity of a human body is detected according to an embodiment, radiation efficiency and reflection coefficient of a first signal via the first wireless communication circuit 1131 are shown. The first wireless communication circuit 1131 according to an embodiment may secure constant radiation efficiency and reflection coefficient in a frequency band of about 750 MHz or about 880 MHz according to the connection relationship between the first wireless communication circuit 1131 and the plurality of conductive portions 1110. For example, in a case where the first switching circuit 1141 is connected to the first conductive portion 1111, a first radiation efficiency 1411 and a first reflection coefficient 1421 may be obtained. According to another example, in a case where the first switching circuit 1141 is connected to the second conductive portion 1112, a second radiation efficiency 1412 and a second reflection coefficient 1422 may be obtained.

Referring to FIGS. 5A-5E, FIG. 11, and FIG. 14B, in a case where proximity of a human body is detected according to an embodiment, radiation efficiency and reflection coefficient of a second signal via the second wireless communication circuit 1132 are shown. For example, in a case where proximity of a human body is detected, radiation efficiency 1430 and reflection coefficient 1440 of a second signal via the second wireless communication circuit 1132 may be obtained.

Figure 15:
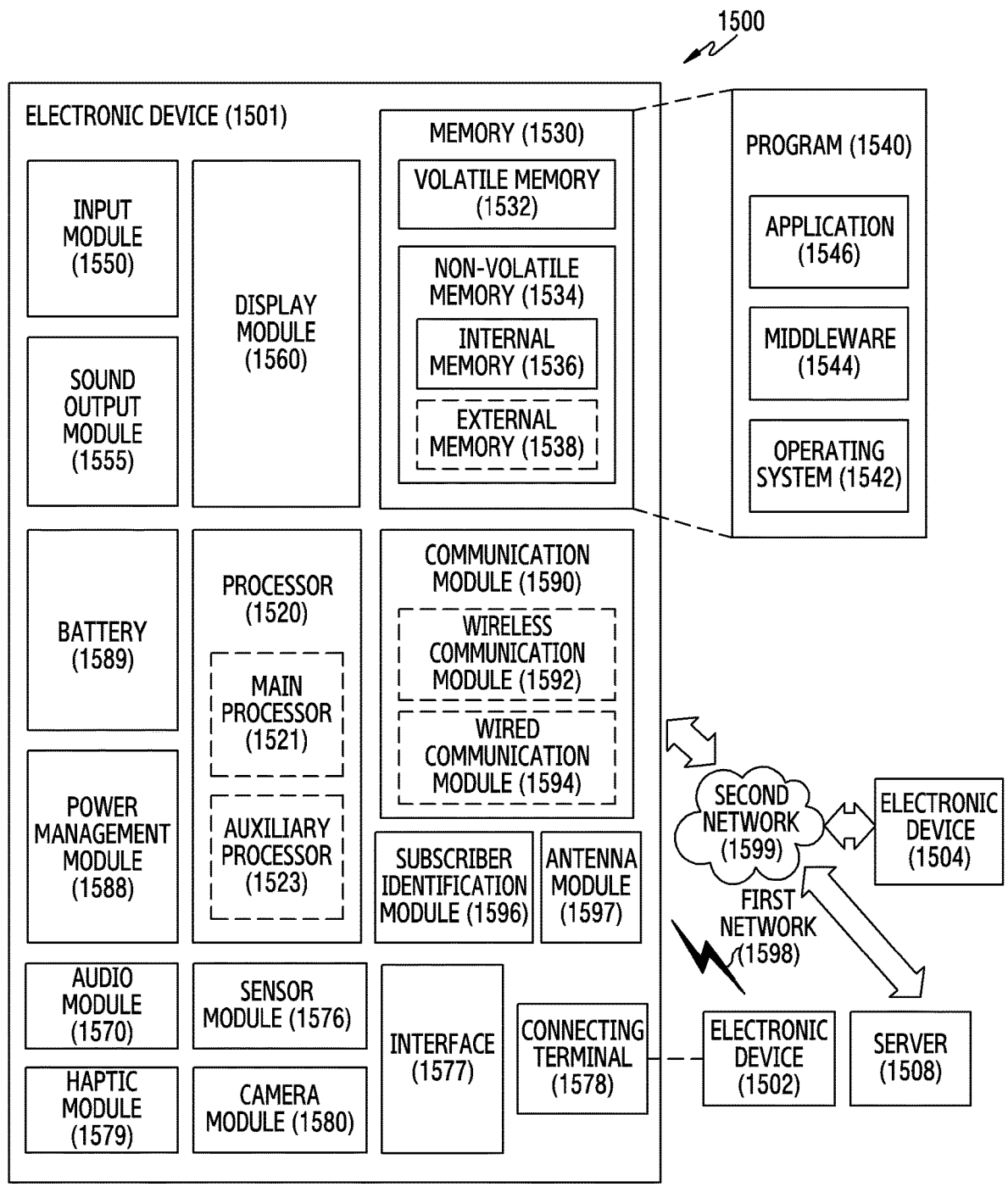
FIG. 15 is a block diagram of an electronic device in a network environment according to various embodiments.

FIG. 15 is a block diagram of an electronic device in a network environment according to various embodiments.

Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input module 1550, a sound output module 1555, a display module 1560, an audio module 1570, a sensor module 1576, an interface 1577, a connecting terminal 1578, a haptic module 1579, a camera module 1580, a power management module 1588, a battery 1589, a communication module 1590, a subscriber identification module (SIM) 1596, or an antenna module 1597. In some embodiments, at least one of the components (e.g., the connecting terminal 1578) may be omitted from the electronic device 1501, or one or more other components may be added in the electronic device 1501. In some embodiments, some of the components (e.g., the sensor module 1576, the camera module 1580, or the antenna module 1597) may be implemented as a single component (e.g., the display module 1560).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may store a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), or an auxiliary processor 1523 (e.g., a graphics processing unit (GPU), a neural processing unit (NPU), an image signal processor (ISP), a sensor hub processor, or a communication processor (CP)) that is operable independently from, or in conjunction with, the main processor 1521. For example, when the electronic device 1501 includes the main processor 1521 and the auxiliary processor 1523, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control, for example, at least some of functions or states related to at least one component (e.g., the display module 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active (e.g., executing an application) state. According to an embodiment, the auxiliary processor 1523 (e.g., an image signal processor or a communication processor) may be implemented as part of another component (e.g., the camera module 1580 or the communication module 1590) functionally related to the auxiliary processor 1523. According to an embodiment, the auxiliary processor 1523 (e.g., the neural processing unit) may include a hardware structure specified for artificial intelligence model processing. An artificial intelligence model may be generated by machine learning. Such learning may be performed, e.g., by the electronic device 1501 where the artificial intelligence model is performed or via a separate server (e.g., the server 1508). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input module 1550 may receive a command or data to be used by another component (e.g., the processor 1520) of the electronic device 1501, from the outside (e.g., a user) of the electronic device 1501. The input module 1550 may include, for example, a microphone, a mouse, a keyboard, a key (e.g., a button), or a digital pen (e.g., a stylus pen).

The sound output module 1555 may output sound signals to the outside of the electronic device 1501. The sound output module 1555 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 1560 may visually provide information to the outside (e.g., a user) of the electronic device 1501. The display module 1560 may include, for example, a display, a hologram device, or a projector and control circuitry to control a corresponding one of the display, hologram device, and projector. According to an embodiment, the display module 1560 may include a touch sensor adapted to detect a touch, or a pressure sensor adapted to measure the intensity of force incurred by the touch.

The audio module 1570 may convert a sound into an electrical signal and vice versa. According to an embodiment, the audio module 1570 may obtain the sound via the input module 1550, or output the sound via the sound output module 1555 or an external electronic device (e.g., an electronic device 1502 (e.g., a speaker or a headphone)) directly or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly or wirelessly. According to an embodiment, the interface 1577 may include, for example, a high definition multimedia interface (HDMI), a universal serial bus (USB) interface, a secure digital (SD) card interface, or an audio interface.

The connecting terminal 1578 may include a connector via which the electronic device 1501 may be physically connected with the external electronic device (e.g., the electronic device 1502). According to an embodiment, the connecting terminal 1578 may include, for example, an HDMI connector, a USB connector, an SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device 1504 via the first network 1598 (e.g., a short-range communication network, such as Bluetooth™, wireless-fidelity (Wi-Fi) direct, or infrared data association (IrDA)) or the second network 1599 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify or authenticate the electronic device 1501 in a communication network, such as the first network 1598 or the second network 1599, using subscriber information (e.g., international mobile subscriber identity (IMSI)) stored in the subscriber identification module 1596.

The wireless communication module 1592 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 1592 may support a high-frequency band (e.g., the mmWave band) to achieve, e.g., a high data transmission rate. The wireless communication module 1592 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 1592 may support various requirements specified in the electronic device 1501, an external electronic device (e.g., the electronic device 1504), or a network system (e.g., the second network 1599). According to an embodiment, the wireless communication module 1592 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., a printed circuit board (PCB)). According to an embodiment, the antenna module 1597 may include a plurality of antennas (e.g., array antennas). In such a case, at least one antenna appropriate for a communication scheme used in the communication network, such as the first network 1598 or the second network 1599, may be selected, for example, by the communication module 1590 from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

According to various embodiments, the antenna module 1597 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the external electronic devices 1502 or 1504 may be a device of a same type as, or a different type, from the electronic device 1501.

According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, mobile edge computing (MEC), or client-server computing technology may be used, for example. The electronic device 1501 may provide ultra low-latency services using, e.g., distributed computing or mobile edge computing. In another embodiment, the external electronic device 1504 may include an internet-of-things (IoT) device. The server 1508 may be an intelligent server using machine learning and/or a neural network. According to an embodiment, the external electronic device 1504 or the server 1508 may be included in the second network 1599. The electronic device 1501 may be applied to intelligent services (e.g., smart home, smart city, smart car, or healthcare) based on 5G communication technology or IoT-related technology.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 1540) including one or more instructions that are stored in a storage medium (e.g., the internal memory 1536 or external memory 1538) that is readable by a machine. For example, a processor (e.g., the processor 1520) of the machine may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

Various embodiments of the disclosure may provide a device and method for preventing degradation of radiation performance due to a change in capacitance of a bezel portion used as an antenna in an electronic device.

Embodiments of the disclosure disclosed in the specification and the drawings are only specific examples given to easily describe technical contents according to embodiments of the disclosure and to help understanding of embodiments of the disclosure, and are not intended to limit the scope of embodiments of the disclosure. Therefore, the scope of various embodiments of the disclosure are to be interpreted as encompassing all changed or modified forms derived based on technical ideas of various embodiments of the disclosure, in addition to the embodiments disclosed herein.

What is claimed is:

1. An electronic device comprising:
a frame structure forming at least a part of a side surface of the electronic device,
the side surface surrounding a space between a front surface of the electronic device and a rear surface of the electronic device and comprising a first edge, a second edge extending from the first edge and perpendicular to the first edge, and a third edge extending from the second edge and parallel to the first edge, and the frame structure comprising:
a first insulating portion disposed in the first edge,
a second insulating portion disposed in the second edge,
a third insulating portion disposed in the second edge,
a first conductive portion extending from the first insulating portion to the second edge,
a second conductive portion spaced apart from the first conductive portion by the second insulating portion and corresponding to a part of the second edge, and
a third conductive portion spaced apart from the second conductive portion by the third insulating portion and extending to the third edge;
a wireless communication circuit disposed in the space;
a first switching circuit configured to connect the wireless communication circuit and at least one of the first conductive portion and the second conductive portion;
a second switching circuit configured to connect the wireless communication circuit and at least one of the second conductive portion and the third conductive portion; and
a proximity sensor configured to detect a proximity of a human body with respect to the first edge,
wherein the wireless communication circuit is configured to:
based on the proximity of the human body being not detected by the proximity sensor, feed power to the first conductive portion via the first switching circuit and feed power to the second conductive portion via the second switching circuit, and
based on the proximity of the human body being detected by the proximity sensor, feed power to the first conductive portion and the second conductive portion via the first switching circuit and feed power to the third conductive portion via the second switching circuit.

2. The electronic device of claim 1, further comprising:
a processor electrically connected to the wireless communication circuit; and
a third switching circuit connected to the first conductive portion,
wherein the wireless communication circuit or the processor is configured to, based on the proximity of the human body being detected by the proximity sensor, control the third switching circuit to change electrical paths related to the first conductive portion.

3. The electronic device of claim 1, wherein the wireless communication circuit is configured to, based on the proximity of the human body being detected by the proximity sensor, feed power to the first conductive portion and the second conductive portion via the first switching circuit, feed power to the third conductive portion via the second switching circuit, and then release a connection of the wireless communication circuit with the first conductive portion.

4. The electronic device of claim 3, further comprising:
a processor electrically connected to the wireless communication circuit; and
a fourth switching circuit connected to the second conductive portion,
wherein the processor is configured to control the fourth switching circuit to change electrical paths related to the second conductive portion.

5. The electronic device of claim 1, wherein the proximity sensor is disposed in the space.

6. The electronic device of claim 1, wherein the wireless communication circuit is configured to, based on the proximity of the human body being not detected by the proximity sensor, feed power to the first conductive portion via the first switching circuit, and feed power to the second conductive portion and the third conductive portion via the second switching circuit.

7. A method of operating an antenna of an electronic device, the method comprising:
detecting a proximity of a human body with respect to a first edge of the electronic device;
based on the proximity of the human body being not detected, feeding, by a wireless communication circuit of the electronic device, power to a first conductive portion formed in at least a part of the first edge via a first switching circuit of the electronic device and feeding, by the wireless communication circuit, power to a second conductive portion spaced apart from the first conductive portion via a second switching circuit of the electronic device; and
based on the proximity of the human body being detected, feeding, by the wireless communication circuit, power to the first conductive portion and the second conductive portion via the first switching circuit and feeding, by the wireless communication circuit, power to a third conductive portion spaced apart from the second conductive portion via the second switching circuit.

8. The method of claim 7, further comprising, based on the proximity of the human body being detected, changing electrical paths related to the first conductive portion via a third switching circuit of the electronic device.

9. The method of claim 7, further comprising, based on the proximity of the human body being detected, feeding, by the wireless communication circuit, power to the first conductive portion and the second conductive portion via the first switching circuit, feeding, by the wireless communication circuit, power to the third conductive portion via the second switching circuit, and then releasing a connection of the wireless communication circuit with the first conductive portion.

10. The method of claim 9, further comprising changing electrical paths related to the second conductive portion via a fourth switching circuit of the electronic device.

11. The method of claim 7, further comprising, based on the proximity of the human body being not detected, feeding, by the wireless communication circuit, power to the first conductive portion via the first switching circuit and feeding, by the wireless communication circuit, power to the second conductive portion and the third conductive portion via the second switching circuit.

12. The method of claim 7, further comprising, based on the proximity of the human body being not detected, feeding, by the wireless communication circuit, power to the first conductive portion via the first switching circuit and feeding, by the wireless communication circuit, power to the third conductive portion via the second switching circuit.

13. The method of claim 7, wherein the detecting of the proximity of the human body is performed by a proximity sensor disposed in the electronic device.

14. The method of claim 7, wherein the electronic device further comprises a second edge extending from the first edge and perpendicular to the first edge, and a third edge extending from the second edge and parallel to the first edge, and
wherein the electronic device further comprises a first insulating portion formed in the first edge, a second insulating portion formed in the second edge and disposed between the first conductive portion and the second conductive portion, and a third insulating portion formed in the second edge and disposed between the second conductive portion and the third conductive portion.

15. An electronic device comprising:
a frame structure forming at least a part of a side surface of the electronic device, the side surface surrounding a space between a front surface of the electronic device and a rear surface of the electronic device and comprising a first edge, a second edge extending from the first edge and perpendicular to the first edge, and a third edge extending from the second edge and parallel to the first edge, and the frame structure comprising:
a first insulating portion disposed in the first edge,
a second insulating portion disposed in the second edge,
a third insulating portion positioned in the second edge,
a first conductive portion extending from the first insulating portion to the second edge,
a second conductive portion spaced apart from the first conductive portion by the second insulating portion and corresponding to a part of the second edge, and
a third conductive portion spaced apart from the second conductive portion by the third insulating portion and extending to the third edge;
a first wireless communication circuit and a second wireless communication circuit disposed in the space;
a first switching circuit configured to connect the first wireless communication circuit and at least one of the first conductive portion and the second conductive portion;
a second switching circuit configured to connect the second wireless communication circuit and at least one of the second conductive portion and the third conductive portion; and
a proximity sensor configured to detect a proximity of a human body with respect to the first edge,
wherein based on the proximity of the human body being not detected by the proximity sensor, the first wireless communication circuit is configured to feed power to the first conductive portion via the first switching circuit and feed power to the second conductive portion via the second switching circuit, and
wherein based on the proximity of the human body being detected by the proximity sensor, the first wireless communication circuit is configured to feed power to the first conductive portion and the second conductive portion via the first switching circuit and the second wireless communication circuit is configured feed power to the third conductive portion via the second switching circuit.

16. The electronic device of claim 15, wherein based on the proximity of the human body being detected by the proximity sensor, the first wireless communication circuit is configured to transmit or receive a first signal in a first frequency band via the first conductive portion and the second conductive portion, and the second wireless communication circuit is configured to transmit or receive a second signal in a second frequency band different from the first frequency band via the third conductive portion.

17. The electronic device of claim 15, further comprising a third switching circuit connected to the first conductive portion and configured to change electrical paths related to the first conductive portion.

18. The electronic device of claim 17, further comprising a fourth switching circuit to the second conductive portion and configured to change electrical paths related to the second conductive portion.

19. The electronic device of claim 15, further comprising a processor electrically connected to the first wireless communication circuit and the second wireless communication circuit,
wherein the processor is configured to:
determine whether the first wireless communication circuit is used alone or the first wireless communication circuit among the first wireless communication circuit and the second wireless communication circuit is preferentially used to transmit or receive a signal, and
based on the first wireless communication circuit being used alone or the first wireless communication circuit among the first wireless communication circuit and the second wireless communication circuit being preferentially used, determine whether the proximity of the human body is detected by the proximity sensor.

20. The electronic device of claim 19, wherein the processor is further configured to:
based on the first wireless communication circuit being not used alone or the first wireless communication circuit among the first wireless communication circuit and the second wireless communication circuit being not preferentially used, determine whether the second wireless communication circuit is used alone or the second wireless communication circuit among the first wireless communication circuit and the second wireless communication circuit is preferentially used to transmit or receive the signal.

* * * * *